United States Patent
Cho et al.

(10) Patent No.: US 9,269,133 B2
(45) Date of Patent: Feb. 23, 2016

(54) METHOD AND SYSTEM FOR PROVIDING COOKING INFORMATION ABOUT FOOD

(71) Applicant: Samsung Electronics Co., Ltd., Suwon-si (KR)

(72) Inventors: Young-ei Cho, Seoul (KR); Na-ri Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 69 days.

(21) Appl. No.: 14/180,500

(22) Filed: Feb. 14, 2014

(65) Prior Publication Data

US 2014/0334691 A1 Nov. 13, 2014

(30) Foreign Application Priority Data

May 10, 2013 (KR) .................. 10-2013-0053390

(51) Int. Cl.
- *G06K 9/00* (2006.01)
- *G06T 7/00* (2006.01)
- *G06Q 30/06* (2012.01)

(52) U.S. Cl.
CPC .......... *G06T 7/0004* (2013.01); *G06Q 30/0631* (2013.01); *G06Q 30/0643* (2013.01); *G06T 2207/10004* (2013.01); *G06T 2207/30128* (2013.01)

(58) Field of Classification Search
None
See application file for complete search history.

(56) References Cited

U.S. PATENT DOCUMENTS

| | | |
|---|---|---|
| 8,418,919 B1 | 4/2013 | Beyda |
| 2011/0184972 A1 | 7/2011 | Ard et al. |
| 2012/0296754 A1 | 11/2012 | Boncyk et al. |
| 2013/0117106 A1 | 5/2013 | Glassman et al. |
| 2014/0047387 A1 | 2/2014 | Iwabuchi et al. |
| 2014/0095479 A1* | 4/2014 | Chang et al. ................. 707/722 |

FOREIGN PATENT DOCUMENTS

| | | |
|---|---|---|
| KR | 10-2011-0003705 A | 1/2011 |
| KR | 10-2012-0126157 A | 11/2012 |
| WO | 2012/105069 A1 | 8/2012 |

OTHER PUBLICATIONS

Bonanni, Leonardo, Chia-Hsun Lee, and Ted Selker. "CounterIntelligence: Augmented reality kitchen." Proc. CHI. vol. 2239. 2005.*

(Continued)

*Primary Examiner* — Nirav G Patel
(74) *Attorney, Agent, or Firm* — Sughrue Mion, PLLC

(57) ABSTRACT

Provided are a method and system for providing cooking information about food. The method includes receiving, from a camera, an ingredients image of at least one ingredient on a plate; determining the at least one ingredient based on the ingredients image; determining a food recommendation list related to the at least one ingredient, based on user information about a user of a mobile device; obtaining cooking information about food that is selected from the food recommendation list; and providing the cooking information to a projector that is connected to the mobile device, wherein the cooking information is projected, via the projector, onto the plate on which the at least one ingredient is disposed.

21 Claims, 21 Drawing Sheets

(56) References Cited

OTHER PUBLICATIONS

Suzuki, Yu, Shunsuke Morioka, and Hirotada Ueda. "Cooking support with information projection onto ingredient." Proceedings of the 10th asia pacific conference on Computer human interaction. ACM, 2012.*

Communication dated Jun. 26, 2015 issued by the European Patent Office in counterpart European Patent Application No. 14155110.1.

* cited by examiner

METHOD AND SYSTEM FOR PROVIDING COOKING INFORMATION ABOUT FOOD

RELATED APPLICATION

This application claims priority from Korean Patent Application No. 10-2013-0053390, filed on May 10, 2013, in the Korean Intellectual Property Office, the disclosure of which is incorporated herein in its entirety by reference.

BACKGROUND

1. Field

Apparatuses and systems in accordance with one or more exemplary embodiments relate to a method and system for providing cooking information about food, and more particularly, to a method and system for providing cooking information about food to a plate on which ingredients are placed.

2. Description of the Related Art

In general, a user cooks food based on his or her experiences and knowledge. Also, the user cooks food according to a recipe written in a book or provided through the Internet.

However, in this case, the user may be inconvenienced because he or she has to go to a room that is distant from the kitchen, to review the recipe, and then come back to the kitchen to cook the food. Also, while a user is actually using cookware, he or she may have difficulty in simultaneously obtaining cooking information about the food via books or the Internet.

Thus, there is a demand for a technology for efficiently providing a user with cooking information used when cooking food, and shopping information and nutrition information related to the food, and by doing so, enable the user to easily cook the food.

SUMMARY

One or more exemplary embodiments may provide a method and system for providing cooking information about food by recommending the food by using an image of ingredients on a plate, and then by projecting the cooking information about the food onto the plate via a projector.

One or more exemplary embodiments may provide a method and system for providing cooking information about food by recognizing ingredients by using an image of the ingredients, and then by recommending food that is appropriate for a user.

One or more exemplary embodiments may provide a method and system for providing cooking information about food by changing the cooking information when ingredients on a plate are changed.

One or more exemplary embodiments may provide a method and system for providing cooking information about food by providing shopping information about ingredients of the food.

One or more exemplary embodiments may provide a method and system for providing cooking information about food by providing information about a cooking status.

Additional exemplary aspects will be set forth in part in the description which follows and, in part, will be apparent from the description, or may be learned by practice of the presented embodiments.

According to an aspect of an exemplary embodiment, a method, performed by a mobile device, of providing information that is used by a user to cook food includes: receiving, from a camera, an ingredients image of at least one ingredient on a plate; determining the at least one ingredient based on the ingredients image; obtaining a food recommendation list related to the at least one ingredient, based on user information about the user of the mobile device; obtaining cooking information about food that is selected from the food recommendation list; and providing the cooking information to a projector that is connected to the mobile device, wherein the cooking information is projected, via the projector, onto the plate on which the at least one ingredient is disposed.

The operation of determining the at least one ingredient may include providing the ingredients image to a server, and receiving information about a type and a weight of the at least one ingredient from the server.

The operation of obtaining the food recommendation list may include operations of providing the user information to a server, and receiving, from the server, the food recommendation list that includes food recommended by the server based on the ingredients image and the user information.

The food recommendation list may be recommended based on at least one of a weight of the user, a gender of the user, preferred food of the user, and a health condition of the user.

The cooking information may include information about a type and a weight of at least one additional that is used by the user to cook the food, and information about a series of detailed cooking processes of cooking the food.

The operation of providing the cooking information may include operations of first providing the information about a type and a weight of the at least one additional ingredient to the projector, and sequentially providing, to the projector, the series of detailed cooking processes to the.

When an amount of the at least one ingredient on the plate is changed, the method may further include an operation of obtaining new cooking information based on a new weight of the at least one ingredient, and the new cooking information may be provided to the projector.

The method may further include operations of determining whether one or more additional ingredients that are used by the user to cook the food are contained in a refrigerator connected to the mobile device; and obtaining shopping information about at least one ingredient that is not contained in the refrigerator and that is from among the one or more additional.

The shopping information may be provided to the user via at least one of a screen of the mobile device and the projector.

The mobile device may be docked with a cradle device, and the mobile device may be connected with the camera and the projector via the cradle device.

According to an aspect of another exemplary embodiment, a mobile device includes a memory which stores at least one program; and a processor for providing information that is used by a user to cook food, by executing the at least one program, and wherein the at least one program includes commands for executing operations of: receiving an ingredients image of at least one ingredient on a plate from a camera; determining the at least one ingredient based on the ingredients image; obtaining a food recommendation list related to the at least one ingredient, based on user information about the user of the mobile device; obtaining cooking information about food that is selected from the food recommendation list; and providing the cooking information to a projector that is connected to the mobile device, wherein the cooking information is projected, via the projector, onto the plate on which the at least one ingredient is disposed.

The operation of determining recognizing the at least one ingredient may include operations of providing the ingredients image of the at least one ingredient to a server, and receiving information about a type and a weight of the at least one ingredient from the server.

The operation of obtaining the food recommendation list may include operations of providing the user information to a server, and receiving, from the server, the food recommendation list that includes food recommended by the server based on the ingredients image and the user information.

The food recommendation list may be recommended based on at least one of a weight of the user, a gender of the user, preferred food of the user, and a health condition of the user.

The cooking information may include information about a type and a weight of at least one additional ingredient that is used by the user to cook the food, and information about a series of detailed cooking processes of cooking the food.

The operation of providing the cooking information may include operations of first providing the information about a type and a weight of the at least one additional ingredient to the projector, and sequentially providing the series of detailed cooking processes to the projector.

When an amount of the at least one ingredient on the plate is changed, the mobile device may further include a command for executing an operation of determining new cooking information based on a new weight of the changed amount of the at least one ingredient, and the new cooking information may be provided to the projector.

The mobile device may further include commands for executing operations of determining whether one or more additional ingredients that are used by the user to cook the food are contained in a refrigerator connected to the mobile device; and obtaining shopping information about at least one ingredient that is not contained in the refrigerator and that is from among the one or more additional ingredients.

The shopping information may be provided to the user via at least one of a screen of the mobile device and the projector.

The mobile device may be docked with a cradle device whereby the mobile device may be connected with the camera and the projector.

According to an aspect of another exemplary embodiment, a method of providing, performed by a server, information that is used by a user to cook food includes operations of receiving an ingredients image of at least one ingredient on a plate from a mobile device; determining the at least on ingredient based on the ingredients image; receiving user information about the user of the mobile device from the mobile device; generating cooking information about a food that is related to the at least one ingredient, based on the user information; and providing the cooking information to the mobile device, wherein the image of the ingredients is generated by a camera connected to the mobile device, and is provided from the camera to the mobile device, and wherein the cooking information that is provided to the mobile device is projected onto the plate via a projector connected to the mobile device.

According to an aspect of another exemplary embodiment, a method of providing, by a mobile device, information that is used by a user to cook food includes operations of receiving an ingredients image of at least one ingredient on a plate from a camera; determining the at least one ingredient based on the ingredients image; and providing cooking information, which is about food related to the at least one ingredient, to a projector that is connected to the mobile device, wherein the cooking information is projected, via the projector, onto the plate on which the at least one ingredient is disposed.

According to an aspect of another exemplary embodiment, there is provided a non-transitory computer-readable recording medium having recorded thereon a program which, when executed by a computer, performs a method according to an exemplary embodiment described herein.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
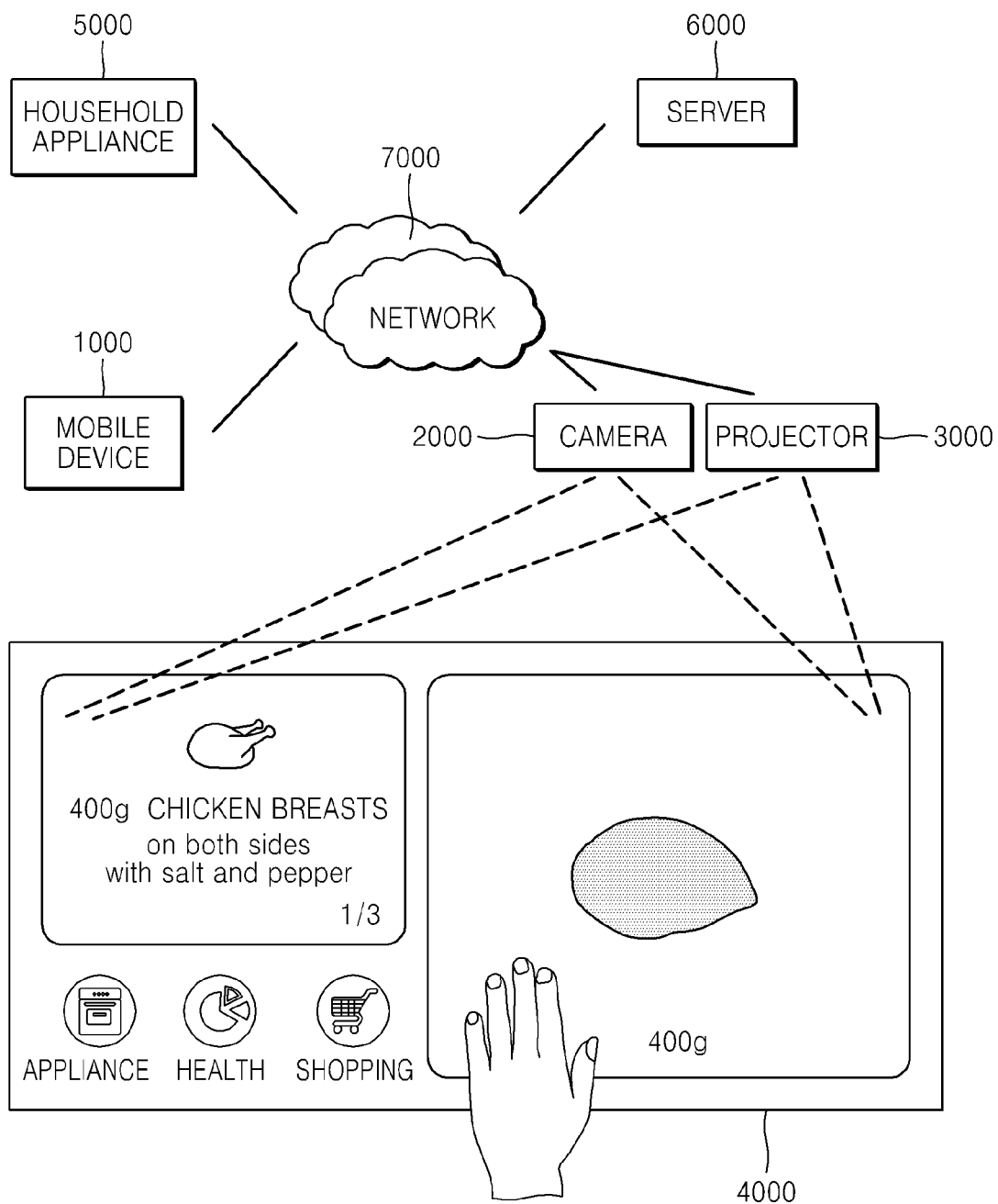
FIG. 1 is a diagram illustrating a system for providing cooking information according to an exemplary embodiment.

Hereinafter, exemplary embodiments will be described more fully with reference to the accompanying drawings. These embodiments, however, should not be construed as limiting; rather, these embodiments are provided so that this disclosure will be thorough and complete, and will fully convey the concept of the invention to those of ordinary skill in the art. In the following description, well-known functions or constructions are not described in detail so as not to obscure the description with unnecessary detail. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. Also, when a part "includes" or "includes" an element, unless there is a particular description contrary thereto, the part can further include other elements.

Expressions such as "at least one of," when preceding a list of elements, modify the entire list of elements and do not modify the individual elements of the list.

FIG. 1 is a diagram illustrating a system for providing cooking information according to an exemplary embodiment.

Referring to FIG. 1, the system includes a mobile device 1000, a camera 2000, a projector 3000, a plate 4000, a household appliance 5000, a server 6000, and a network 7000.

The mobile device 1000 obtains cooking information about cooking food and projects the obtained cooking information onto the plate 4000 using the projector 3000. The mobile device 1000 may receive, from the camera, an image of the plate 4000 and the ingredients on the plate 4000, and may provide a food recommendation list to a user based on the image of the plate and user information. Also, the mobile device 1000 may select predetermined food, based on a user input, and may project cooking information related to the selected food onto the plate 4000 using the projector 3000. The cooking information indicates information about cooking food. For example, the cooking information may include information about the names of ingredients to be cooked, types of the ingredients, weights of the ingredients, and a cooking method.

Also, the mobile device 1000 may obtain, from the household appliance 5000, an identification (ID) value of ingredients that are contained in the household appliance 5000. Also, the mobile device 1000 may determine the ingredients needing to be purchased to make the food, based on the collected ID value of the ingredients that are currently in the household appliance. The mobile device 1000 may provide shopping information to the user related to the ingredients to be purchased. According to this aspect, the household appliance 5000 may be a refrigerator.

Also, the mobile device 1000 may receive, from the household appliance 5000, information about an operation of the household appliance 5000 that is used in a current cooking process. According to this aspect, the household appliance 5000 may be a microwave oven. The mobile device 1000 may inform the user of the cooking status related to the current cooking process, based on the information about the operation of the household appliance 5000.

The mobile device 1000 may determine what ingredients or food are on the plate 4000 based on an image provided by the camera 2000, and may provide nutrition information related to the ingredients or food to the user.

The mobile device 1000 may include, but is not limited to, a smartphone, a tablet phone, a mobile phone, a personal digital assistant (PDA), a laptop, a media player, and a global positioning system (GPS) device.

The camera 2000 captures an image of the plate 4000, an image of the ingredients on the plate 4000, and an image of a user gesture made above the plate 4000, and provides the images to the mobile device 1000. The image of the ingredients, which is captured by the camera 2000, may be used by the mobile device 1000 to determine the ingredients. Also, the image of the user gesture, which is captured by the camera 2000, may be used by the mobile device 1000 to determine a user input. For example, the camera 2000 may include, but is not limited to, a two dimensional (2D) camera and a three dimensional (3D) camera.

The projector 3000 projects various types of information onto the plate 4000. The projector 3000 may receive predetermined information from the mobile device 1000 and may project the received information onto the plate 4000. For example, the projector 3000 may project, but is not limited to, the cooking information, the shopping information, and notice information about cooking onto the plate 4000. Also, the projector 3000 may receive information about a projection target position from the mobile device 1000, and may project the cooking information onto a predetermined position on the plate 3000, based on the received information about the projection target position.

The ingredients may be placed on the plate 4000, and various types of cooking information about cooking food may be displayed on the plate 4000. For example, the plate 4000 may be positioned on a sink or the like.

The household appliance 5000 may be connected to the mobile device 1000 via the network 7000 and may provide, to the mobile device 1000, the ID value of the ingredients that are contained in the household appliance 5000. Also, the household appliance 5000 may provide information about the operation of the household appliance 5000 to the mobile device 1000, and then the mobile device 1000 may provide information about a cooking status of food to the user by using the information about the operation of the household appliance 5000. For example, the household appliance 5000 may include, but is not limited to, an oven, a gas range, a microwave oven, and a refrigerator. Also, the household appliance 5000 may be connected to the mobile device 1000 via a home network but exemplary embodiments are not limited thereto. Also, for example, the household appliance 5000 may be directly connected to the mobile device 1000 or may be connected to the mobile device 1000 via a home gateway (not shown), but exemplary embodiments are not limited thereto.

The server 6000 provides to the mobile device 1000 at least one of information about the ingredients on the plate 4000, a food recommendation list, and the cooking information about cooking food. The server 6000 may receive the image of the ingredients from the mobile device 1000, may analyze the received image of the ingredients, and then may determine a name, a type, and a weight of the ingredients. Also, the server 6000 may receive user information from the mobile device 1000, and may recommend predetermined food by using the received user information. Also, the server 6000 may provide, to the mobile device 1000, information about ingredients that are required for cooking the food and a plurality of pieces of information about detailed cooking processes.

The network 7000 may be a wired network including a local area network (LAN), a wide area network (WAN), and a value added network (VAN), or a wireless network including a mobile radio communication network, a near field communication (NFC) network, and a satellite communication network. Also, the network 7000 may be a general data communication network that allows all parties of the system of FIG. 1 to smoothly communicate with each other, and includes wired internet, wireless internet, and a mobile wireless communication network.

Figure 2:
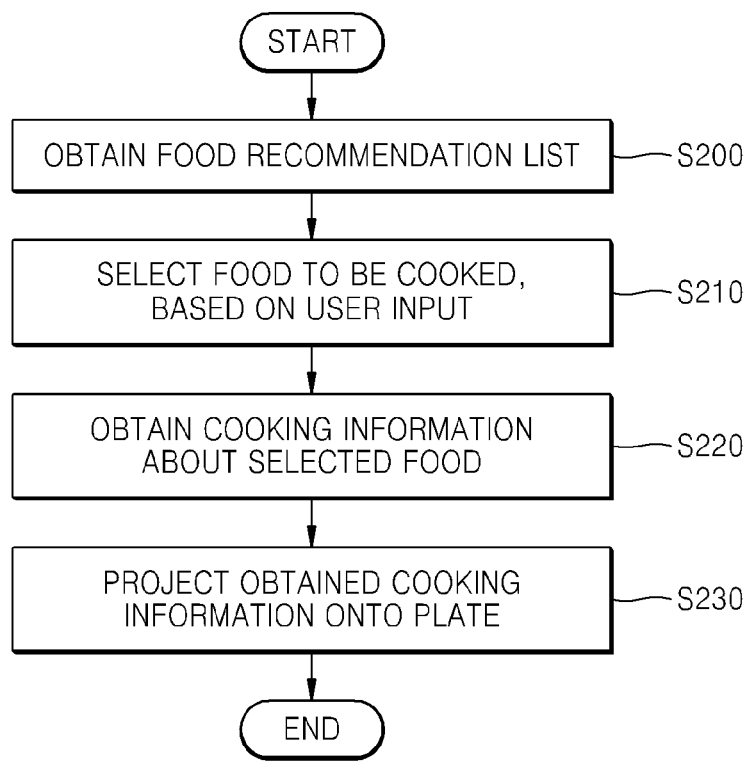
FIG. 2 is a flowchart of a method of a mobile device providing cooking information about food to a plate, according to an exemplary embodiment.

FIG. 2 is a flowchart of a method of providing, by the mobile device 1000, cooking information about food to the plate 4000, according to an embodiment.

In operation S200, the mobile device 1000 obtains a food recommendation list. The mobile device 1000 may receive an ingredients image of ingredients on the plate 4000 from the camera 2000, and may determine the ingredients based on the ingredients image. The mobile device 1000 may determine a name, a type, and a weight of the ingredients. For example, the mobile device 1000 may provide the ingredients image to the server 6000 and then may receive information about the name, the type, and the weight of the ingredients from the server 6000, but one or more embodiments are not limited thereto. That is, the mobile device 1000 itself may analyze the ingredients image and may recognize which ingredients are placed on the plate 4000.

Also, the mobile device 1000 may obtain a food recommendation list based on the determined ingredients. The mobile device 1000 may obtain the food recommendation list based on user information of a user who uses the mobile device 1000. For example, the mobile device 1000 may obtain the food recommendation list to be recommended to the user, based on at least one of a gender, a weight, a height, body fat, preferred food, and a health condition of the user. The mobile device 1000 may provide the user information to the server 6000 and may receive the food recommendation list from the server 6000 but exemplary embodiments are not limited thereto. That is, the mobile device 1000 may directly generate the food recommendation list based on the user information.

As described above, the mobile device 1000 may obtain the food recommendation list based on the ingredients on the plate 4000 but exemplary embodiments are not limited thereto. That is, regardless of the ingredients on the plate 4000, the mobile device 1000 may obtain a food recommendation list to be provided to the user.

Also, the mobile device 1000 may display the food recommendation list on a screen of the mobile device 1000 or may project the food recommendation list onto the plate 4000 by using the projector 3000.

In operation S210, the mobile device 1000 may select food to be cooked, based on a user input. The user input may be a user gesture input on the plate 4000. For example, the user may move a user's hand on the plate 4000, and a movement of the user's hand may be photographed by the camera 2000 and then may be provided to the mobile device 1000. Also, the user input may involve touching the screen of the mobile device 1000.

In operation S220, the mobile device 1000 obtains cooking information about selected food. The cooking information may be information about cooking of the food, and may include ingredients information and a plurality of pieces of information about detailed cooking processes. The mobile device 1000 may obtain a plurality of pieces of information about ingredients required for the user to cook the selected food. For example, when first ingredients are on the plate 4000, and a food including the first ingredients is selected to be cooked, the mobile device 1000 may obtain a plurality of pieces of information about second and third ingredients that are also required to cook the selected food. Also, for example, when the first ingredients weigh 400 g, the mobile device 1000 may recognize that 100 g of the second ingredients and 50 g of the third ingredients are required for the user to cook the selected food.

Also, the mobile device 1000 may obtain the plurality of pieces of information about detailed cooking processes for the cooking of the selected food. The plurality of pieces of information about detailed cooking processes may include sequentially-listed cooking operations that are to be performed by the user to cook the food. For example, the detailed cooking processes may include, but are not limited to, a process of cutting the first ingredients, a process of combining the first ingredients and the second ingredients, a process of roasting the combined first and second ingredients in an oven, and a process of sprinkling the third ingredients on the first and second ingredients that are roasted in the oven.

The mobile device 1000 may receive the ingredients information and the plurality of pieces of information about the detailed cooking processes from the server 6000 but exemplary embodiments are not limited thereto. That is, the mobile device 1000 may generate the ingredients information and the plurality of pieces of information about detailed cooking processes.

In operation S230, the mobile device 1000 projects the cooking information onto the plate 4000. The mobile device 1000 may provide the cooking information to the projector 3000, and then the projector 3000 may project the cooking information onto the plate 4000. Also, the mobile device 1000 may provide, to the projector 3000, position information about a position on the plate 4000 on which the cooking information is to be displayed, and then the projector 3000 may project the cooking information onto the plate 4000 based on the position information.

Figure 3:
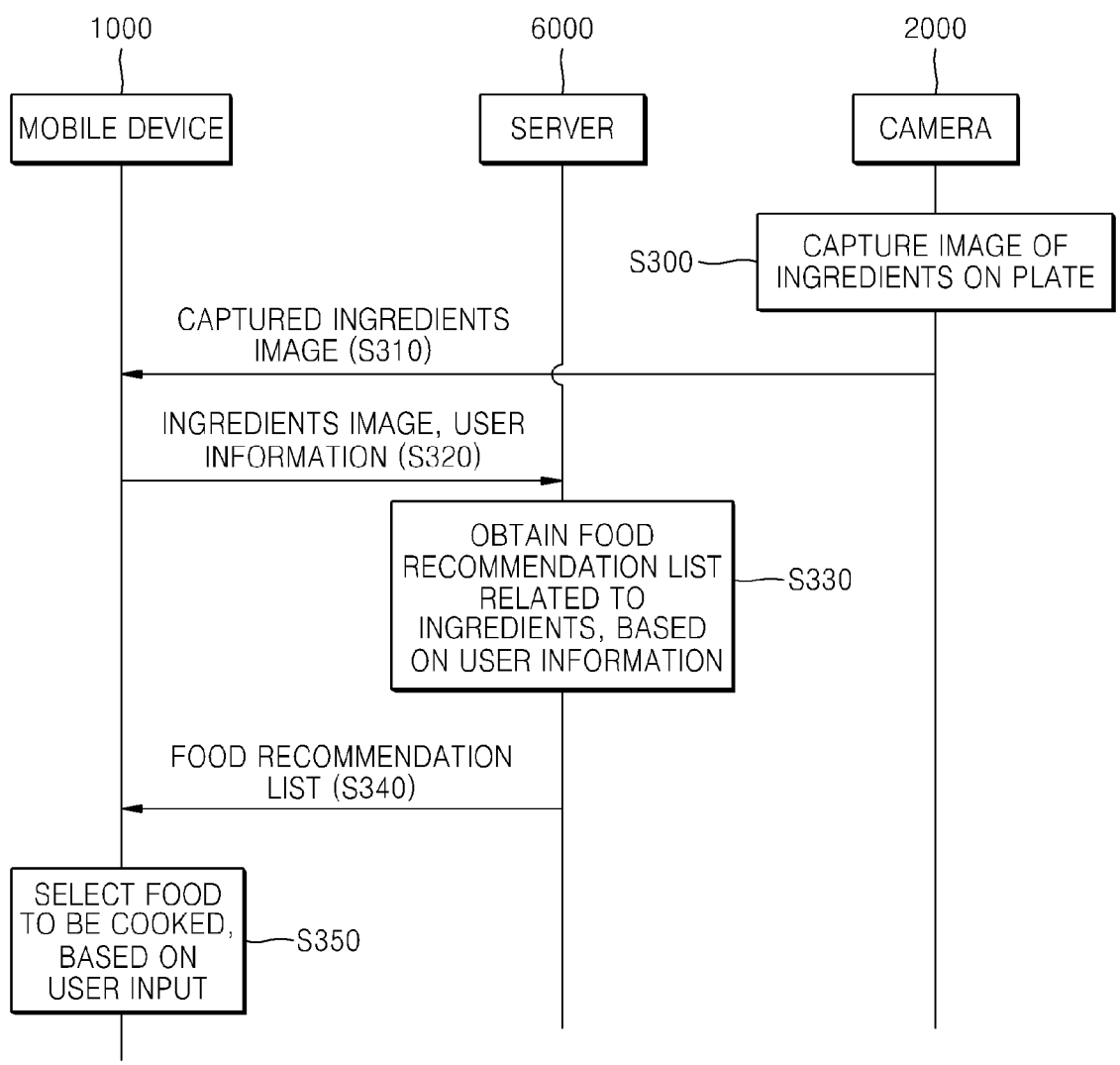
FIG. 3 is a flowchart of a method of providing a food recommendation list, according to an exemplary embodiment.

FIG. 3 is a flowchart of a method of providing a food recommendation list, according to an exemplary embodiment.

In operation S300, the camera 2000 captures an image of ingredients on the plate 4000. A user may place the ingredients on the plate 4000, and the camera 2000 may capture the ingredients image of the ingredients on the plate 4000. Also, the camera 2000 may generate at least one of a still image and a moving picture image by photographing the ingredients. Also, the camera 2000 may generate a 2D image or a 3D image by photographing the ingredients.

In operation S310, the camera 2000 provides the ingredients image to the mobile device 1000. The camera 2000 may provide at least one of a still image and a moving picture image to the mobile device 1000. Also, the camera 2000 may provide an image of an ingredient or an image of a plurality of ingredients to the mobile device 1000.

In operation S320, the mobile device 1000 provides the ingredients image and the user information to the server 6000.

The mobile device 1000 may provide, to the server 6000, the ingredients image and an ID of the user of the mobile device 1000. For example, the ID of the user may include, but is not limited thereto, a telephone number of the mobile device 1000, a service ID of the user, and a name of the user. Also, the user information may include not only the ID of the user but also may include, but is not limited thereto, a name and type of user-preferred food, a height and weight of the user, and a user-preferred taste.

In operation S330, the server 6000 obtains the food recommendation list related to the ingredients, based on the user information. The server 6000 may determine the gender, height, body fat, weight, and health condition of the user, based on the ID of the user which is received from the mobile device 1000. Also, the server 6000 may determine the name and type of the user-preferred food, and the user-preferred taste, based on the ID value of the user. In this case, a plurality of pieces of information about the gender, height, body fat, weight, and health condition of the user, the name and type of the user-preferred food, and the user-preferred taste may be associated with the ID of the user and may be previously stored in the server 6000. Also, the plurality of pieces of information about the gender, height, body fat, weight, and health condition of the user, the name and type of the user-preferred food, and the user-preferred taste may be previously stored in another device (not shown) of the user, and a social network service (SNS) server (not shown).

Also, the server 6000 may generate the food recommendation list related to the ingredients on the plate 4000, in consideration of the height and weight of the user. Also, the server 6000 may generate the food recommendation list, in consideration of the name and type of the user-preferred food, and the user-preferred taste. Also, the server 6000 may generate the food recommendation list, in consideration of the health condition of the user.

In operation S340, the server 6000 provides the food recommendation list to the mobile device 1000.

In operation S350, the mobile device 1000 selects the food to be cooked, based on a user input. The mobile device 1000 may project the food recommendation list, which is received from the server 6000, onto the plate 4000 by using the projector 3000. In this case, the mobile device 1000 may recognize a user gesture on the plate 4000 by using the camera 2000, and may select predetermined food based on the recognized user gesture.

Also, the mobile device 1000 may display the food recommendation list, which is received from the server 6000, on a screen of the mobile device 1000, and may select the predetermined food based on a touch input to the screen of the mobile device 1000.

Figure 4:
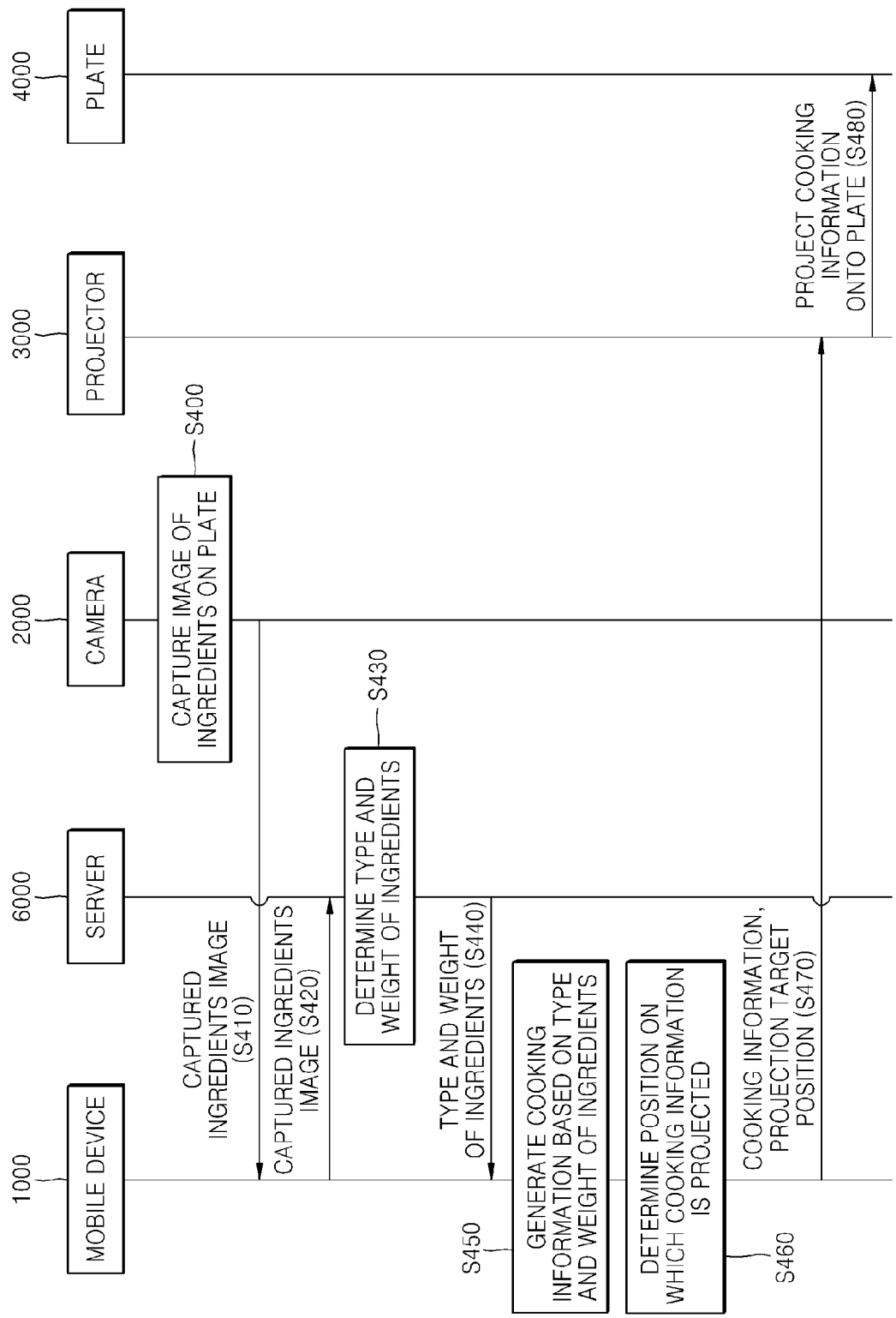
FIG. 4 is a flowchart of a method of providing cooking information related to ingredients on the plate, which is performed in the system for providing cooking information, according to an exemplary embodiment.

FIG. 4 is a flowchart of a method of providing cooking information related to ingredients on the plate 4000, which is performed in the system for providing cooking information, according to an embodiment.

In operation S400, the camera 2000 captures an image of the ingredients on the plate 4000. A user may place the ingredients on the plate 4000, and the camera 2000 may capture the ingredients image of the ingredients on the plate 4000. Also, the camera 2000 may generate at least one of a still image and a moving picture image by photographing the ingredients.

Also, the mobile device 1000 may recommend an amount of the ingredients based on user information (e.g., a weight and body fat of the user) for the user, and may project information about the recommended amount of the ingredients onto the plate 4000. Also, the user may place the ingredients on the plate 4000, in consideration of the recommended amount of the ingredients.

In operation S410, the camera 2000 provides the ingredients image to the mobile device 1000. The camera 2000 may provide at least one of the still image and the moving picture image to the mobile device 1000. Also, the camera 2000 may provide an image of ingredients or an image of a plurality of ingredients to the mobile device 1000.

In operation S420, the mobile device 1000 provides the ingredients image to the server 6000.

In operation S430, the server 6000 determines a name, a type, and a weight of the ingredients based on the ingredients image. The server 6000 may have images of various ingredients previously stored in a database (DB) (not shown), and may compare the ingredients image, which is received from the mobile device 1000, with an ingredients image that is previously stored in the DB, so that the server 6000 may determine which ingredients are placed on the plate 4000.

Also, the server 6000 may estimate a volume of the ingredients on the plate 4000, based on the received ingredients image. For example, a notch mark may be marked on the plate 4000, and the server 6000 may estimate the volume of the ingredients on the plate 4000 by using the notch mark appearing in the ingredients image. Also, for example, a size value of the plate 4000 may be previously stored in the server 6000, and the server 6000 may estimate the volume of the ingredients on the plate 4000 based on the size value, but one or more embodiments are not limited thereto.

The server 6000 may recognize a weight of the ingredients on the plate 4000, based on the volume of the ingredients. In this case, the server 6000 may have a density value for each of names or types of ingredients previously stored in a database. Also, the server 6000 may calculate the weight of the ingredients by multiplying the density value of the ingredients by the weight of the ingredients.

In operation S440, the server 6000 provides information about the name, the type, and the weight of the ingredients to the mobile device 1000.

As described above, the server 6000 may determine the weight of the ingredients based on the ingredients image, and may provide the weight of the ingredients to the mobile device 1000, but one or more embodiments are not limited thereto. That is, a predetermined sensor (e.g., a pressure sensor) may be included in the plate 4000, and the plate 4000 may measure the weight of the ingredients on the plate 4000 by using the sensor. In this case, the plate 4000 may provide the information about the weight of the ingredients to the mobile device 1000 by using a communication unit in the plate 4000. Also, the server 6000 may receive a value of the weight of the ingredients from the mobile device 1000.

In operation S450, the mobile device 1000 generates cooking information based on the name, the type, and the weight of the ingredients. The mobile device 1000 may determine food related to the ingredients on the plate 4000 and may generate ingredients information about ingredients that are used by the user to cook the determined food. For example, when first ingredients are placed on the plate 4000, and food from the first ingredients is selected, the mobile device 1000 may extract information about second and third ingredients, which are required by the user to cook the food, from a memory (not shown). In this case, the information about the second and third ingredients may be previously stored in the memory, but one or more embodiments are not limited thereto.

Also, the mobile device 1000 may generate a plurality of pieces of information about detailed cooking processes for cooking of the determined food. For example, the detailed cooking processes may include, but are not limited to, a process of cutting the first ingredients, a process of combining the first ingredients and the second ingredients, a process of roasting the combined first and second ingredients in an oven, and a process of sprinkling the third ingredients on the first and second ingredients that are roasted in the oven.

Also, the mobile device 1000 may determine how to describe the ingredients information and the plurality of pieces of information about detailed cooking processes. The mobile device 1000 may provide, to the user, a plurality of pieces of the generated information in the form of at least one of a text, an image, and a voice.

In operation S460, the mobile device 1000 determines a projection target position on the plate 4000 on which the cooking information is projected. In consideration of a position of the ingredients on the plate 4000, the mobile device 1000 may have the cooking information projected onto an area of the plate 4000 on which the ingredients is not placed.

In operation S470, the mobile device 1000 provides the cooking information and information about the projection target position to the projector 3000. The mobile device 1000 may first provide information about names and weights of the ingredients to the projector 3000. Also, the mobile device 1000 may monitor a current cooking status and may sequentially provide the plurality of pieces of information about detailed cooking processes to the projector 3000, according to the current cooking status.

In operation S480, the projector 3000 projects the cooking information onto the plate 4000. The projector 3000 may project the cooking information onto the plate 4000, based on the information about the projection target position which is received from the mobile device 1000.

Figure 5:
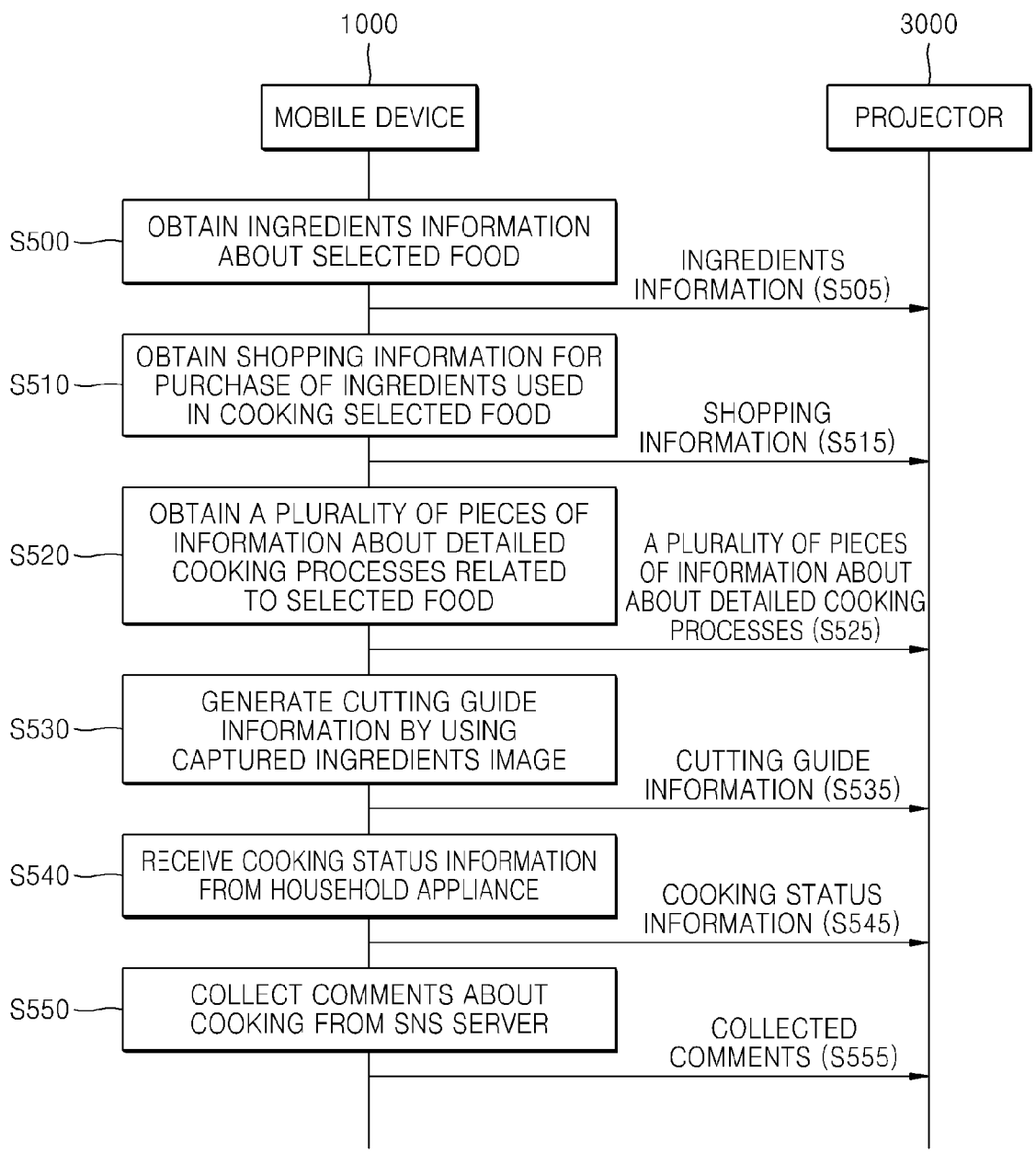
FIG. 5 is a flowchart of a method of the mobile device providing various types of information related to cooking food to a projector, according to an exemplary embodiment.

FIG. 5 is a flowchart of a method of providing, by the mobile device 1000, various types of information related to cooking food to the projector 3000, according to an embodiment.

In operation S500, the mobile device 1000 obtains ingredients information related to selected food. The mobile device 1000 may obtain a plurality of pieces of ingredients information about ingredients that are required by a user to cook the selected food. For example, when first ingredients are placed on the plate 4000, and a food from the first ingredients is selected, the mobile device 1000 may obtain a plurality of pieces of information about second and third ingredients that are required by the user to cook the food. Also, for example, when the first ingredients weigh 400 g, the mobile device 1000 may recognize that 100 g of the second ingredients and 50 g of the third ingredients are required for the user to cook the food.

Also, the mobile device 1000 may recommend an amount of the ingredients based on user information (e.g., a weight and body fat of the user) for the user, and may project information about the recommended amount of the ingredients onto the plate 4000.

When a weight of ingredients on the plate 4000 is changed, the mobile device 1000 may change weights of other ingredients according to the changed weight of the ingredients.

In operation S505, the mobile device 1000 provides the obtained ingredients information to the projector 3000. Also, the ingredients information may be projected onto a predetermined position on the plate 4000 via the projector 3000.

In operation S510, the mobile device 1000 obtains shopping information for the user to purchase the ingredients that are used in cooking the selected food. The mobile device 1000 may obtain shopping information about ingredients that are not contained in the household appliance 5000 and that are from among the ingredients used in cooking the selected food. The shopping information may indicate various types of information which are required for the user to purchase the ingredients, and for example, the shopping information may include, but is not limited to, coupon information and discount information related to the ingredients, an address of a shopping website, and a user interface for shopping. The mobile device 1000 may access a shopping server that sells the ingredients not contained in the household appliance 5000, and may obtain coupon information and discount information related to the ingredients not contained in the household appliance 5000. Also, the mobile device 1000 may generate a predetermined user interface so as to allow the user to purchase the ingredients not contained in the household appliance 5000.

In operation S515, the mobile device 1000 provides the obtained shopping information to the projector 3000. The mobile device 1000 may provide the coupon information and the discount information to the projector 3000, and may provide the user interface for purchasing the ingredients to the projector 3000.

In operation S520, the mobile device 1000 obtains a plurality of pieces of information about detailed cooking processes related to the selected food. For example, the detailed cooking processes may include, but are not limited to, a process of cutting the first ingredients, a process of combining the first and second ingredients, a process of roasting the combined first and second ingredients in an oven, and a process of sprinkling the third ingredients on the first and second ingredients that are roasted in the oven.

In operation S525, the mobile device 1000 provides the plurality of pieces of information about detailed cooking processes to the projector 3000. The mobile device 1000 may monitor cooking statuses by using the camera 2000, and may sequentially provide, to the projector 3000, the plurality of pieces of information about detailed cooking processes according to the cooking statuses, but one or more embodiments are not limited thereto. When a weight of the ingredients on the plate 400 is changed, the mobile device 1000 may change the detailed cooking processes.

In operation S530, the mobile device 1000 generates cutting guide information by using the ingredients image. When there is a need to cut the ingredients on the plate 400, the mobile device 1000 may generate the cutting guide information, based on a shape and position of the ingredients. The cutting guide information is provided for the user so as to guide the user the cutting of the ingredients, and for example, the cutting guide information may include information about at least one guide line (a cutting guide line) that marks a position of the ingredients to be cut. In this case, the mobile device 1000 may determine an interval of the cutting guide line, a total number of the cutting guide line, and a direction and position of the cutting guide line.

In operation S535, the mobile device 1000 provides the cutting guide information to the projector 3000. The cutting guide information may be projected onto the ingredients on the plate 4000 by the projector 3000.

In operation S540, the mobile device 1000 receives cooking status information from the household appliance 5000. The cooking status information indicates information about an operation of the household appliance 5000, wherein the operation is related to food cooking. For example, the cooking status information may include, but is not limited thereto, information informing that the preheating of an oven is completed, information providing an elapsed time of operation of a gas range, and information providing completion of an operation of a microwave range. When the household appliance 5000 is the oven, the information about the operation of the household appliance 5000 may include a temperature of the oven, a cooking time, a cooking status, and a cooking mode. Also, when the household appliance 5000 is the gas range, the information about the operation of the household appliance 5000 may include information informing about a cooking time and information informing about whether cooking is completed.

In operation S545, the mobile device 1000 provides the cooking status information to the projector 3000. Also, the cooking status information may be projected onto the plate 4000 by the projector 3000.

In operation S550, the mobile device 1000 collects comments about the cooking of the selected food from an SNS server (not shown). The mobile device 1000 may upload the selected food and the cooking information about the selected food to the SNS server. Also, a user of another device (not shown) may check the updated information and a comment about the selected food and the cooking information about the selected food on the SNS server. For example, comments may include, but is not limited thereto, a comment about the ingredients included in the cooking information, a comment about a recommendation of using other ingredients, a comment about a cooking method included in the cooking information, and a comment about a recommendation of another cooking method. However, the comment may be unrelated to cooking food.

In operation S555, the mobile device 1000 provides the collected comments to the projector 3000. The provided comments may be projected onto a predetermined position on the plate 4000 by the projector 3000. For example, the comment about the ingredients of food may be projected onto a position around an area of the plate 4000 on which the ingredients are placed. Also, the comment about the cooking method may be projected onto a position around an area of the plate 4000 on which the cooking information is projected, but one or more embodiments are not limited thereto.

Figure 6:
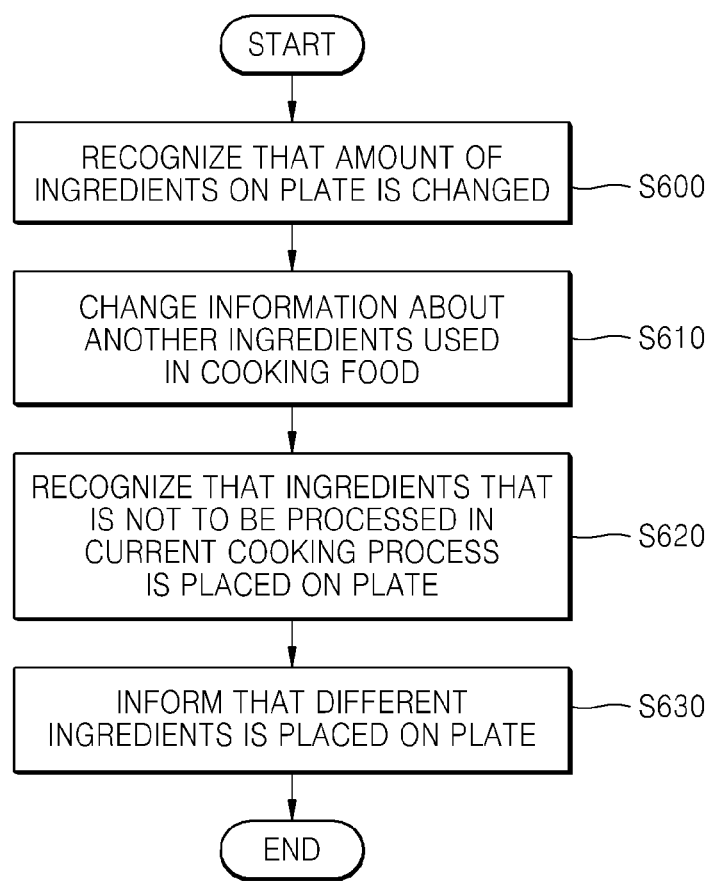
FIG. 6 is a flowchart of a method of the mobile device changing cooking information when ingredients on the plate are changed, according to an exemplary embodiment.

FIG. 6 is a flowchart of a method of changing, by the mobile device 1000, cooking information when ingredients on the plate 4000 are changed, according to an exemplary embodiment.

In operation S600, the mobile device 1000 recognizes that an amount of the ingredients on the plate 4000 is changed. For example, a user may cut 400 g of a first ingredient in half, and then may place 200 g of the first ingredient on the plate 4000. In this case, the mobile device 1000 may monitor the first ingredient on the plate 4000 by using the camera 2000, and may recognize that a weight of the first ingredient is changed from 400 g to 200 g. The mobile device 1000 may recognize the change of the weight of the first ingredient by using an ingredients image of the first ingredient. In this case, the first ingredient may be an ingredient to be processed first by the user to cook food.

In operation S610, the mobile device 1000 changes ingredients information about other ingredients used by the user to cook the food. The mobile device 1000 may change the ingredients information about the other ingredients that are not placed on the plate 4000 and that are from among ingredients used by the user to cook the food. For example, in a case where 400 g of the first ingredient, 100 g of the second ingredient and 50 g of the third ingredient are required for the user to cook the selected food, a weight of the first ingredient may be changed to 200 g. In this case, the mobile device 1000 may change a weight of the second ingredient to 50 g and a weight of the third ingredient to 25 g.

In operation S620, the mobile device 1000 recognizes that ingredients that are not to be processed in a current cooking process are placed on the plate 4000. For example, during a process of cutting the first ingredient, the second ingredient may be placed on the plate 4000. The mobile device 1000 may recognize that the second ingredient that is another ingredient that is placed on the plate 4000, by using a captured image of the second ingredient.

Also when 30 g of the second ingredient is placed on the plate 4000 whereas 50 g of the second ingredient is supposed to be placed on the plate 4000, the mobile device 1000 may recognize that the second ingredient whose weight is different is placed on the plate 4000.

In operation S630, the mobile device 1000 informs the user that the different ingredients are placed on the plate 4000. The mobile device 1000 may generate notice information so as to notify the user about the different ingredients that are placed on the plate 4000, and may provide the notice information to the projector 3000. For example, the notice information may be, but is not limited thereto, a message informing the user that ingredients different from ingredients for the current cooking process are placed on the plate 4000, and a message informing the user which ingredients are required to be placed on the plate 4000 in the current cooking process.

Figure 7:
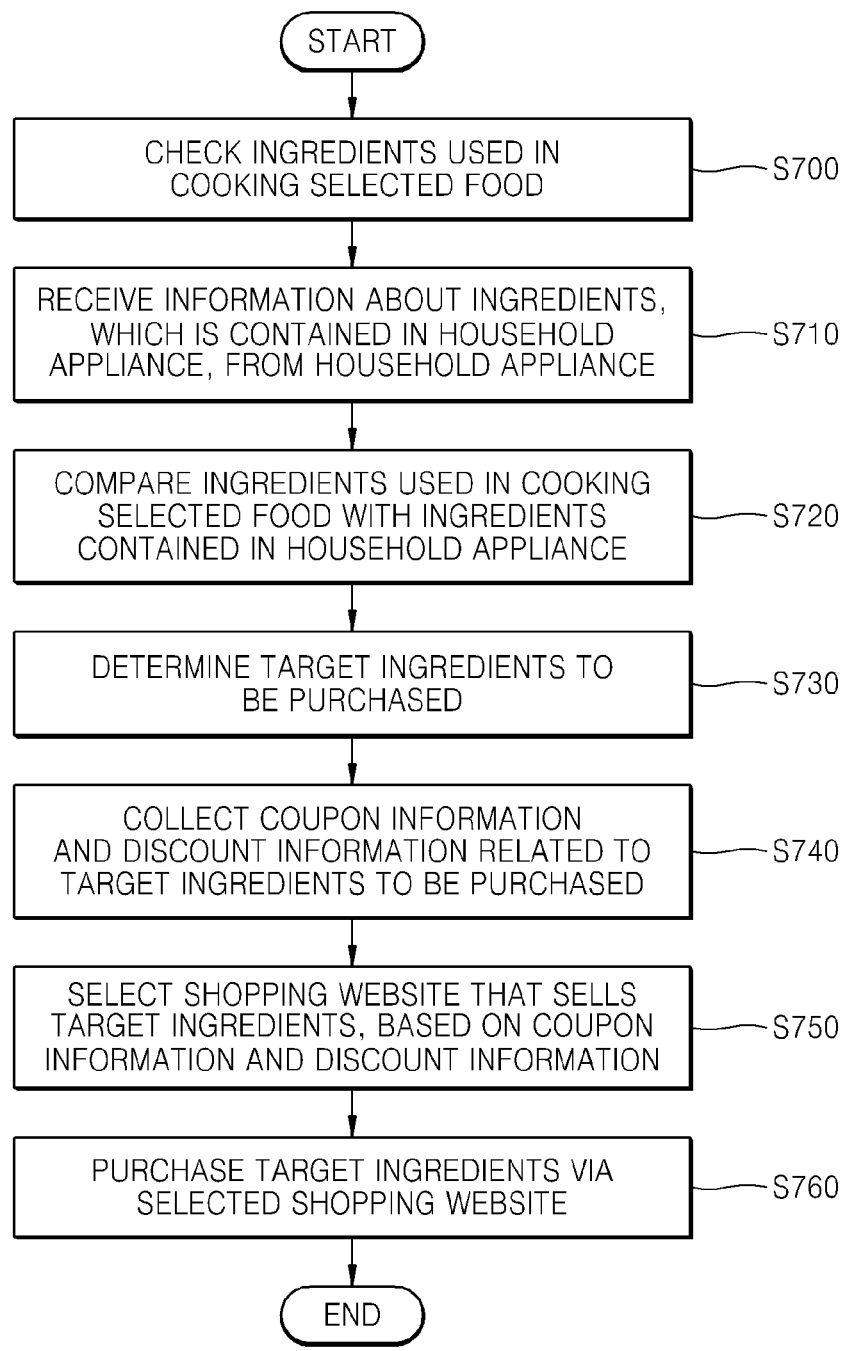
FIG. 7 is a flowchart of a method of the mobile device providing shopping information about ingredients that are used by a user to cook food, according to an exemplary embodiment.

FIG. 7 is a flowchart of a method of providing, by the mobile device 1000, shopping information about ingredients that are used by a user to cook food, according to an exemplary embodiment.

In operation S700, the mobile device 1000 checks ingredients that are used by the user to cook selected food. The user may select the predetermined food to be cooked, and the mobile device 1000 may check a list of the ingredients that are used by the user to cook the selected food. For example, the mobile device 1000 may recognize that a food is selected and first, second, and third ingredients are used by the user to cook the selected food.

A list of ingredients sorted according to names or types of food may be stored in a memory of the mobile device 1000 or a database of the server 6000, but one or more embodiments are not limited thereto.

In operation S710, the mobile device 1000 receives, from the household appliance 5000, information about ingredients that are contained in the household appliance 5000. The household appliance 5000 that contains the ingredients may be a refrigerator or the like. Tags may be attached to the ingredients that are contained in the household appliance 5000, and the household appliance 5000 may read ID values (e.g., names, product names, or the like) of the ingredients in the household appliance 5000 from the tags via radio frequency identification (RFID) communication or NFC. However, one or more embodiments are not limited thereto, and thus the user may directly input ID values of the ingredients that are contained in the household appliance 5000. The household appliance 5000 may transmit the read ID values of the ingredients to the mobile device 1000 by using a predetermined communication method. The household appliance 5000 may check dates of when the ingredients were placed in the household appliance 5000, and conditions of the ingredients. The dates and conditions of the ingredients, which are checked by the household appliance 5000, may be provided to the mobile device 1000, and then the mobile device 1000 may project or may display the dates of the ingredients or the conditions of the ingredients onto the plate 4000 or on a screen of the mobile device 1000.

In operation S720, the mobile device 1000 compares ingredients for cooking the selected food with the ingredients that are contained in the household appliance 5000. The mobile device 1000 may compare the list of the ingredients, which is checked in operation S700, with the ingredients that are checked in operation S710, so that the mobile device 1000 may recognize ingredients that are not contained in the household appliance 5000 and that are among the ingredients for cooking the selected food.

In operation S730, the mobile device 1000 determines target ingredients to be purchased. According to a result of the comparison in operation S720, the mobile device 1000 may determine the ingredients which are the target ingredients to be purchased, wherein the target ingredients are not contained in the household appliance 5000 and are from among the ingredients for cooking the selected food.

In operation S740, the mobile device 1000 collects coupon information and discount information related to the target ingredients to be purchased. The mobile device 1000 may access a shopping server that sells the ingredients that are not contained in the household appliance 5000, and may obtain the coupon information and the discount information related to the ingredients that are not contained in the household appliance 5000.

In operation S750, the mobile device 1000 selects a shopping website that sells the target ingredients, based on the coupon information and the discount information. The mobile device 1000 may recommend one or more shopping websites, based on the coupon information and the discount information. In this case, a list of the recommended shopping websites may include names of the shopping websites, ingredients names, coupon names, and discount rates. Also, the list of the recommended shopping websites may be displayed on the screen of the mobile device 1000 or may be projected onto the plate 4000.

The mobile device 1000 may select one of the recommended shopping websites according to a user input. When the list of the recommended shopping websites is displayed on the screen of the mobile device 1000, a predetermined shopping website may be selected based on a touch input onto the screen of the mobile device 1000. When the list of the recommended shopping websites is projected onto the plate 4000, a predetermined shopping website may be selected based on a user gesture on the plate 4000.

In operation S760, the mobile device 1000 purchases the target ingredients via the selected shopping website. The mobile device 1000 may access the selected shopping website, may provide a user interface for purchasing ingredients to the user, and then may purchase the target ingredients in the selected shopping website based on a user input via the user interface.

Figure 8:
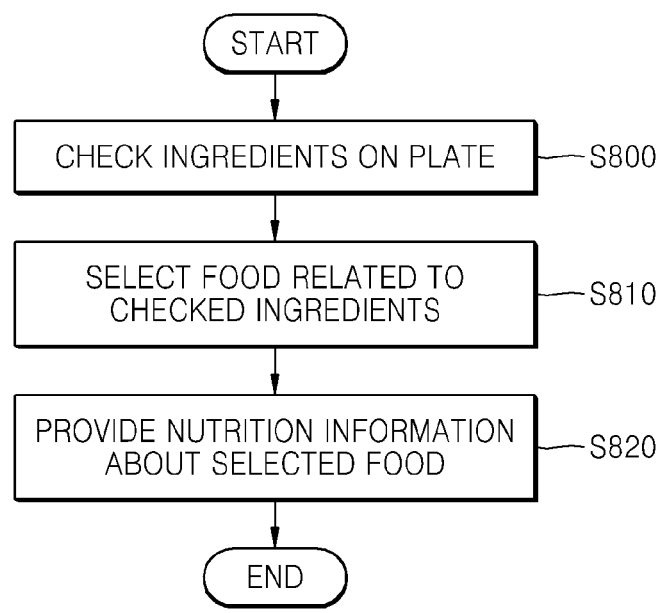
FIG. 8 is a flowchart of a method of the mobile device providing, nutrition information about food, according to an exemplary embodiment.

FIG. 8 is a flowchart of a method of providing, by the mobile device 1000, nutrition information about food, according to an exemplary embodiment.

In operation S800, the mobile device 1000 recognizes ingredients on the plate 4000. The camera 2000 may capture an image of the ingredients on the plate 4000, and the mobile device 1000 may receive the image of the ingredients on the plate 4000 from the camera 2000. Also, the mobile device 1000 may provide the image of the ingredients to the server 6000, and the server 6000 may check a type and name of the ingredients by analyzing the image of the ingredients. The server 6000 may provide the type and name of the ingredients to the mobile device 1000.

The server 6000 may provide a food recommendation list related to the checked ingredients to the mobile device 1000.

As described above, the mobile device 1000 may provide the image of the ingredients to the server 6000 and may receive the type and name of the ingredients, and the food recommendation list related to the checked ingredients from the server 6000, but one or more embodiments are not limited thereto. That is, the mobile device 1000 may check the type and name of the ingredients by analyzing the image of the ingredients, and may generate a food recommendation list related to the ingredients.

In operation S810, the mobile device 1000 selects food related to the checked ingredients. The mobile device 1000 may display or may project the food recommendation list related to the checked ingredients on a screen of the mobile device 1000 or onto the plate 4000. The mobile device 1000 may select at least one food from the food recommendation list, based on a user input.

In operation S820, the mobile device 1000 provides nutrition information related to the selected food. The mobile device 1000 may obtain the nutrition information related to the selected food from the server 6000. The nutrition information is information about nutritional ingredients included in the selected food, for example, the nutrition information may include, but is not limited to, information about food calories and information about primary nutrients included in the selected food.

Figure 9:
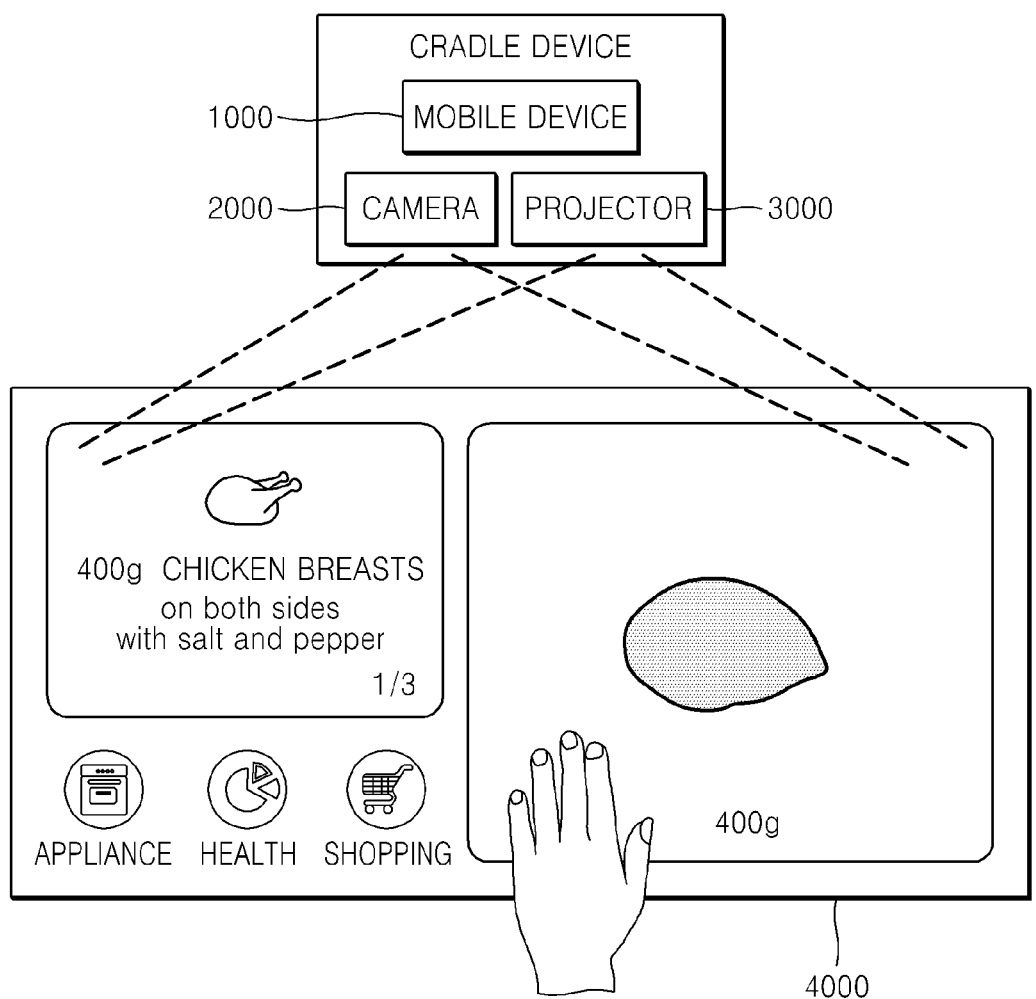
FIG. 9 illustrates an example in which the mobile device is connected with a camera and the projector, according to an exemplary embodiment.

FIG. 9 illustrates an example in which the mobile device 1000 is connected with the camera 2000 and the projector 3000, according to an exemplary embodiment.

The mobile device 1000 may be docked in a cradle device, so that the mobile device 1000 may be connected with the camera 2000 and the projector 3000. In this case, the camera 2000 and the projector 3000 may be embedded in the cradle device, but one or more embodiments are not limited thereto. The camera 2000 and the projector 3000 may be docked with the cradle device.

Figure 10:
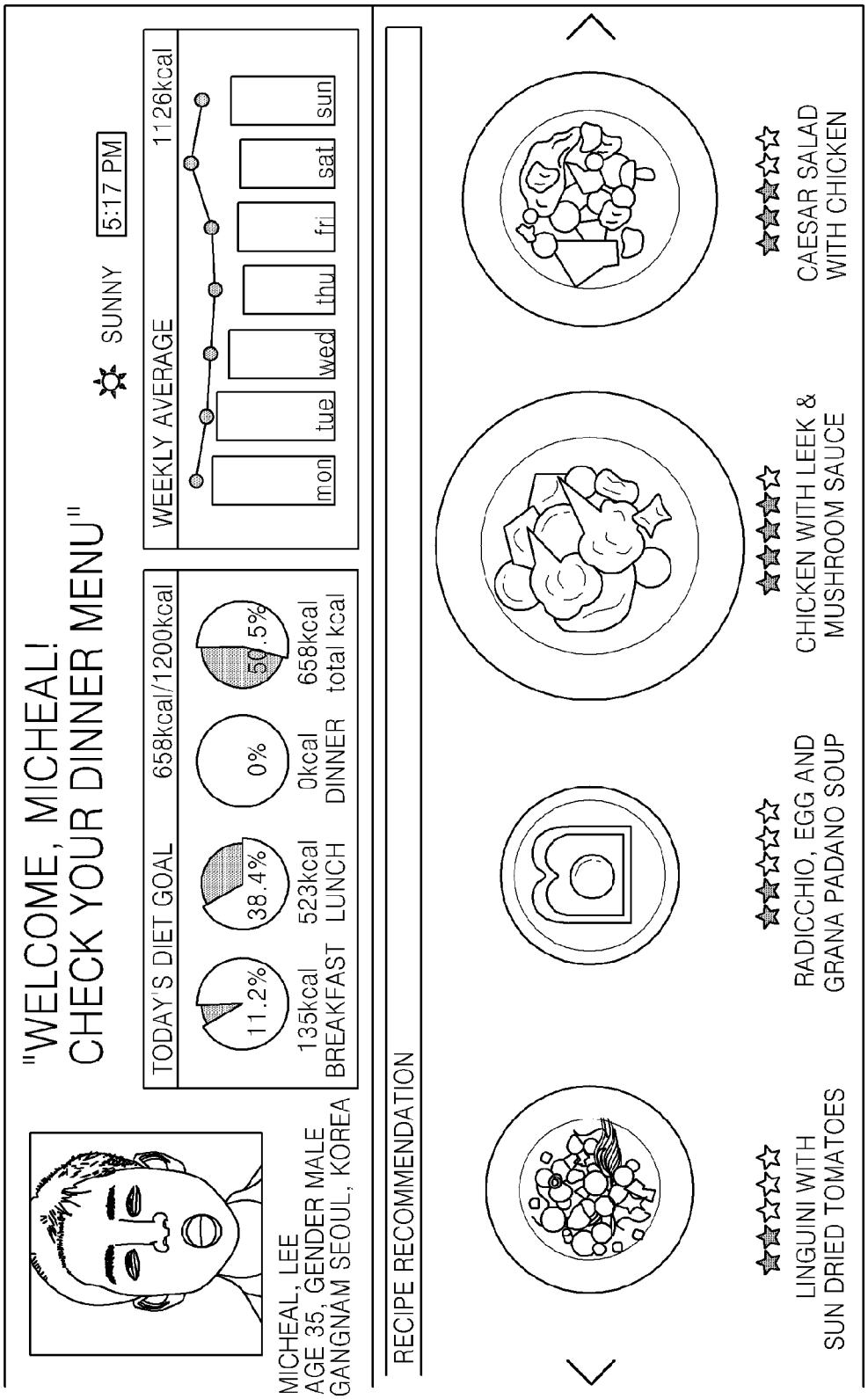
FIG. 10 illustrates an example in which a menu that is recommended based on user information is displayed on a screen of the mobile device, according to an exemplary embodiment.

FIG. 10 illustrates an example in which a menu that is recommended based on user information is displayed on a screen of the mobile device 1000, according to an exemplary embodiment.

Referring to FIG. 10, the mobile device 1000 may display a food recommendation list that is recommended by the server 6000 based on the user information. The mobile device 1000 may provide an ID value of a user to the server 6000, and then the server 6000 may check a name and type of user-preferred food, a height and weight of the user, a user-preferred taste, or the like based on the ID value of the user. The server 6000 may generate the food recommendation list, based on the name and type of the user-preferred food, the height and weight of the user, the user-preferred taste, or the like, and may provide the food recommendation list to the mobile device 1000.

As illustrated in FIG. 10, the mobile device 1000 may display the food recommendation list on the screen of the mobile device 1000. For example, the food recommendation list may include food images, food names, and food evaluation information.

The user may select predetermined food from the food recommendation list by touching the screen of the mobile device 1000. However, one or more embodiments are not limited thereto, and the mobile device 1000 may select predetermined food based on a user gesture on the plate 4000. In this case, the mobile device 1000 may receive, from the camera 2000, a captured image of the user gesture on the plate 4000, may analyze the image, and then may select the predetermined food.

When predetermined information that is displayed on the mobile device 1000 includes a plurality of pages, the mobile device 1000 may turn a page, based on a user gesture on the plate 4000. For example, when the user moves a hand from a left side to a right side of the plate 4000 within a predetermined time period, the mobile device 1000 may turn a page that is displayed on the screen of the mobile device 1000.

The mobile device 1000 may recognize a user gesture on the plate 4000, and when an image of the user gesture is input, the mobile device 1000 may output a predetermined alarm sound.

Figure 11:
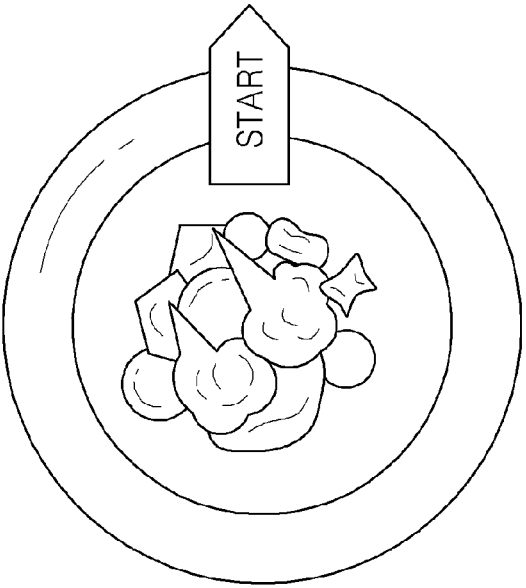
FIG. 11 illustrates an example in which ingredients information about food that is selected by a user is displayed on a screen of the mobile device, according to an exemplary embodiment.

FIG. 11 illustrates an example in which ingredients information about food that is selected by a user is displayed on a screen of the mobile device 1000, according to an exemplary embodiment.

Referring to FIG. 11, when the food is selected, the mobile device 1000 may display an image, a name, a cooking time, calorie information, and nutrition information of the selected food. The mobile device 1000 may also display images, names, and weights of ingredients that are required by the user to cook the food. When a "START" icon on the screen of the mobile device 1000 is selected, as will be described with reference to FIG. 18, the mobile device 1000 may project cooking information onto the plate 4000 by using the projector 3000.

Figure 12:
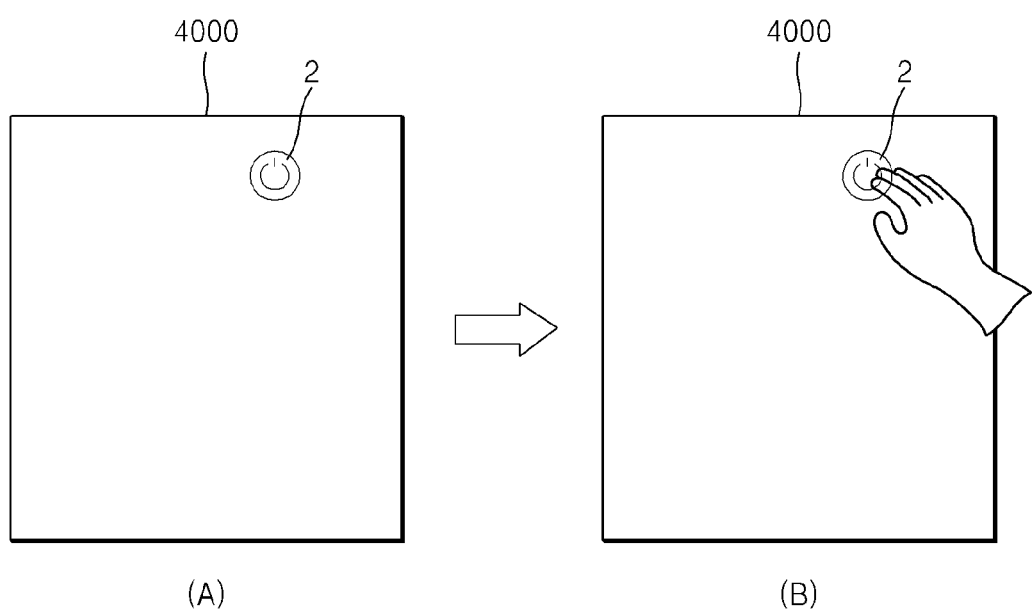
FIG. 12 illustrates an example in which a cooking information providing service is initialized by using an icon displayed on the plate, according to an exemplary embodiment.

FIG. 12 illustrates an example in which a cooking information providing service is initialized by using an icon displayed on the plate 4000, according to an exemplary embodiment.

Referring to FIG. 12(*a*), an icon 2 for initialization of the cooking information providing service may be displayed on the plate 4000. Also, as illustrated in FIG. 12(*b*), when a user's hand is positioned on the icon 2 for a predetermined time period, the cooking information providing service may be initialized. When the cooking information providing service is initialized, an initialization screen for the cooking information providing service may be projected onto the plate 4000. Also, when the user's hand is positioned on the icon 2, a color of the icon 2 may be changed and may be projected onto the plate 4000.

When the user's hand is positioned at a predetermined position of the plate 4000 while the icon 2 is not displayed on the plate 4000, the mobile device 1000 may activate the projector 3000 and may project the icon 2 onto the plate 4000 by using the activated projector 3000. Also, when the user' hand is positioned on the icon 2 for the predetermined time period, the cooking information providing service may be initialized.

When the user's hand is positioned on the icon 2 for the predetermined time period, the mobile device 1000 may determine that the icon 2 is selected. In order to inform the user of the selection of the icon 2, the mobile device 1000 may output an alarm sound or may change at least one of a color and a shape of the icon 2.

Figure 13:
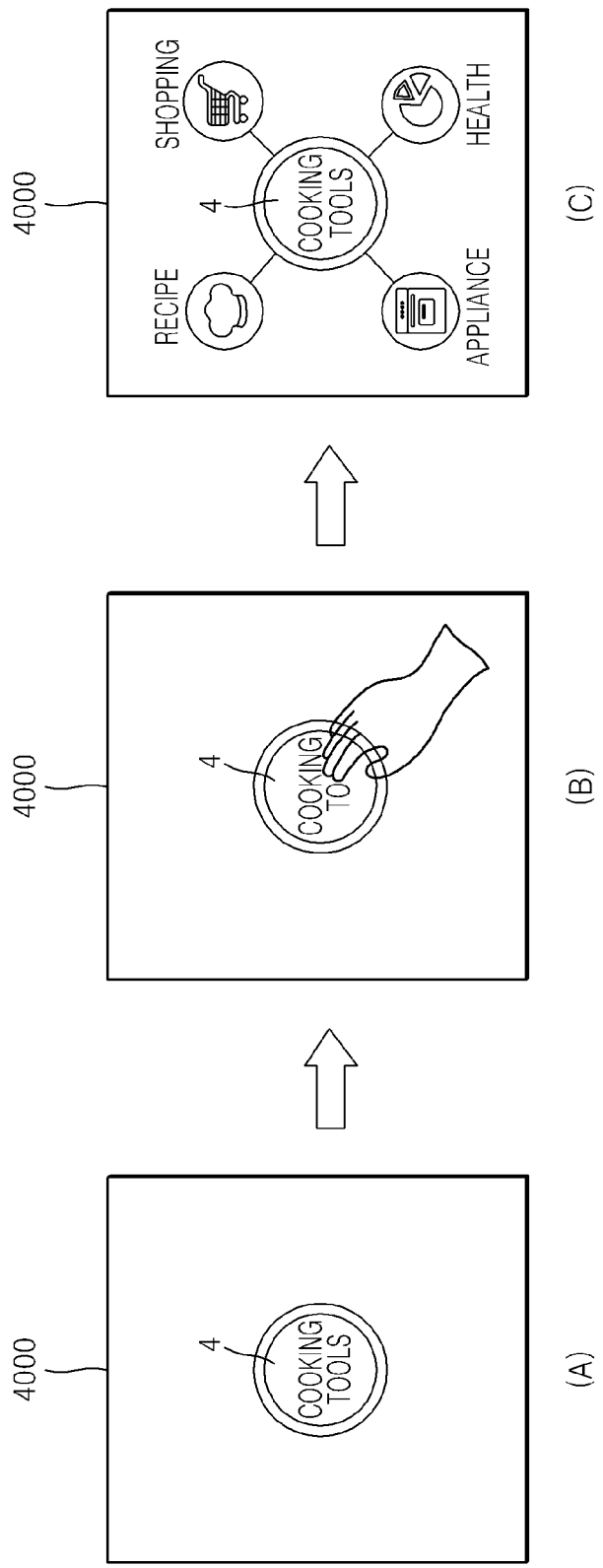
FIG. 13 illustrates a menu image that is projected onto the plate, according to an exemplary embodiment.

FIG. 13 illustrates a menu image 4 that is projected onto the plate 4000, according to an exemplary embodiment.

Referring to FIG. 13(*a*), the menu image 4 for allowing a user to use a cooking information providing service may be projected onto the plate 4000. The menu image 4 may move slightly, for example, an animation effect may be applied to the menu image 4 so that the menu image 4 may appear to be floating on water.

Referring to FIG. 13(*b*), when a user's hand is positioned on the menu image 4 for a predetermined time period, as illustrated in FIG. 13(*c*), a plurality of icons included in the menu image 4 may be displayed. When the user performs a predetermined gesture on the menu image 4, as illustrated in FIG. 13(*c*), the plurality of icons included in the menu image 4 may be displayed.

Figure 14:
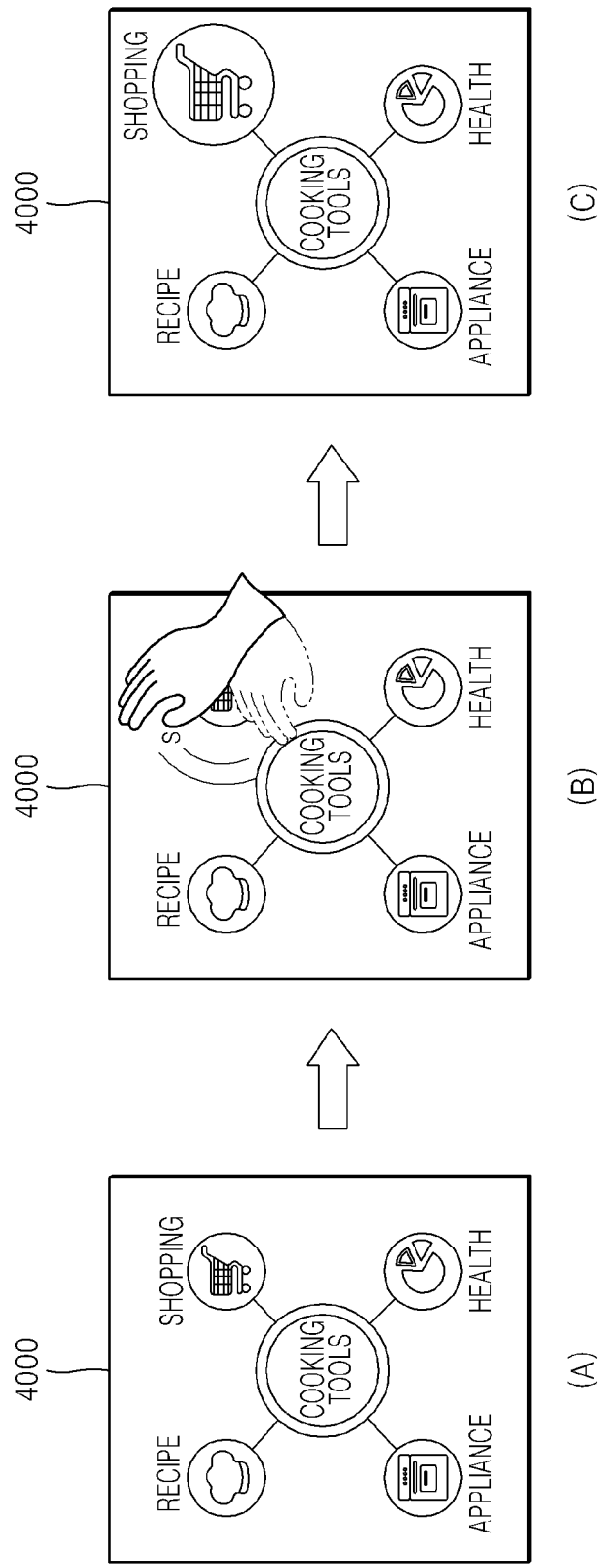
FIG. 14 illustrates an example in which an icon included in a menu image is selected based on a user gesture, according to an exemplary embodiment.

FIG. 14 illustrates an example in which an icon included in a menu image is selected based on a user gesture, according to an exemplary embodiment.

When a user performs a predetermined gesture on the plate 4000, as illustrated in FIG. 14(*a*), the menu image for allowing a user to use a cooking information providing service may be projected onto the plate 4000. For example, the menu image may include a 'RECIPE' icon, an 'APPLIANCE' icon, a 'SHOPPING' icon, and a 'HEALTH' icon. When the 'RECIPE' icon is selected, cooking information about food may be provided. When the 'APPLIANCE' icon is selected, information about a status of the household appliance 5000 related to cooking food may be provided. When the 'SHOPPING' icon is selected, shopping information related to purchasing ingredients may be provided. When the 'HEALTH' icon is selected, nutrition information about food on the plate 4000 may be provided.

As illustrated in FIG. 14(*b*), the user performs a predetermined gesture on the 'SHOPPING' icon of the menu image, so that the 'SHOPPING' icon may be selected. Since the 'SHOPPING' icon is selected, as illustrated in FIG. 14(*c*), a size of the 'SHOPPING' icon may be increased, compared to other icons.

In order to inform the user of the selection of an icon, the mobile device 1000 may output a predetermined alarm sound or may change at least one of a color and a shape of the icon.

Figure 15:
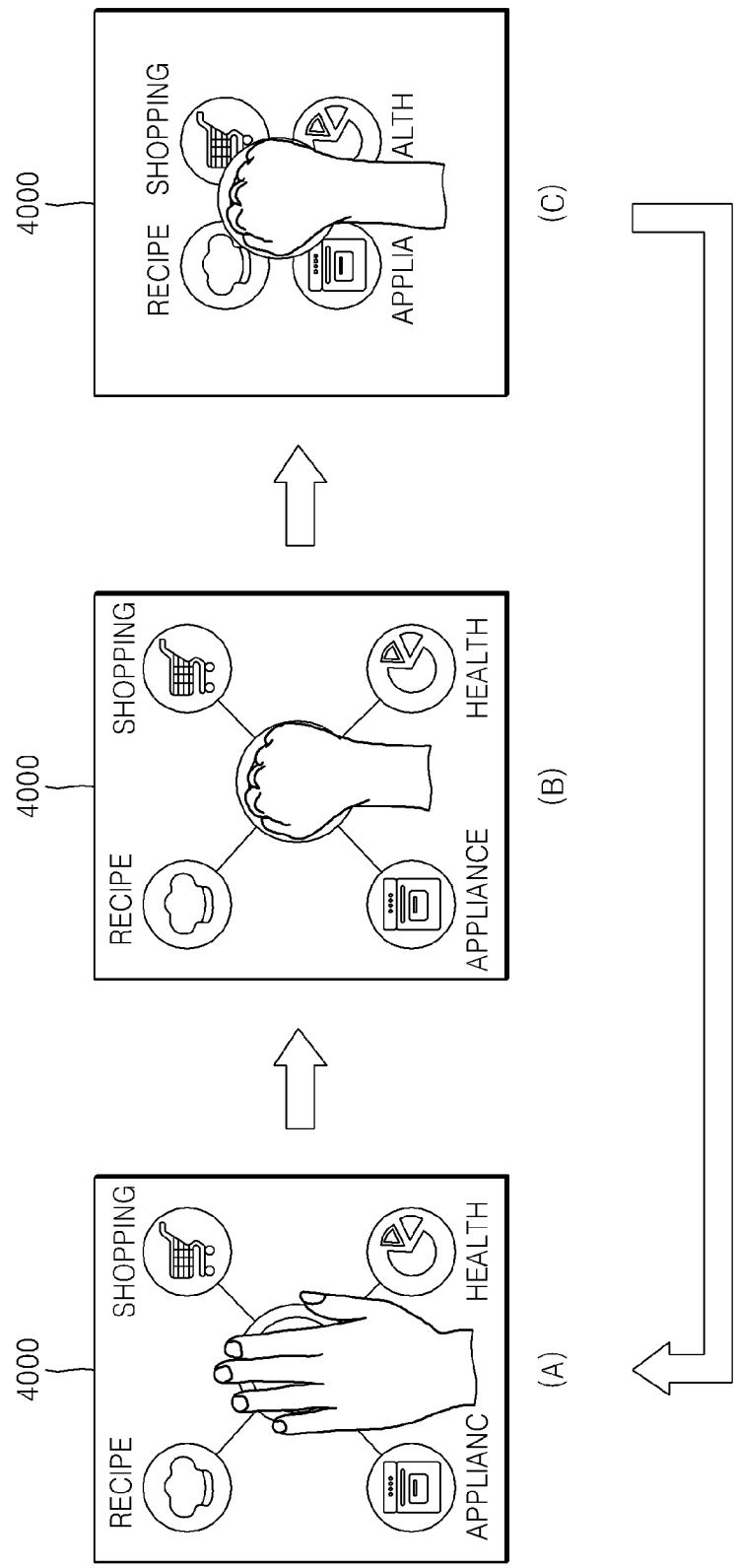
FIG. 15 illustrates an example in which a menu image that is displayed on the plate is changed from a selection mode to a movement mode, based on a user gesture, according to an exemplary embodiment.

FIG. 15 illustrates an example in which a menu image that is displayed on the plate 4000 is changed from a selection mode to a movement mode, based on a user gesture, according to an exemplary embodiment.

A menu image of each of FIGS. 15(*a*) and 15(*b*) is of the selection mode, and during the selection mode, when a user selects one of icons included in the menu image, a service that corresponds to the selected icon may be provided to the user.

A menu image of FIG. 15(*c*) is of the movement mode, and during the movement mode, the menu image may move and may be displayed on the plate 4000.

As illustrated in FIG. 15(*a*), the user may position a user's hand on the menu image, and as illustrated in FIG. 15(*b*), the user may close the user' hand. Accordingly, as illustrated in FIG. 15(*c*), the menu image may be changed from the selection mode to the movement mode. When the user opens the user' hand, as illustrated in FIG. 15(*a*), the menu image may be changed again from the movement mode to the selection mode.

Figure 16:
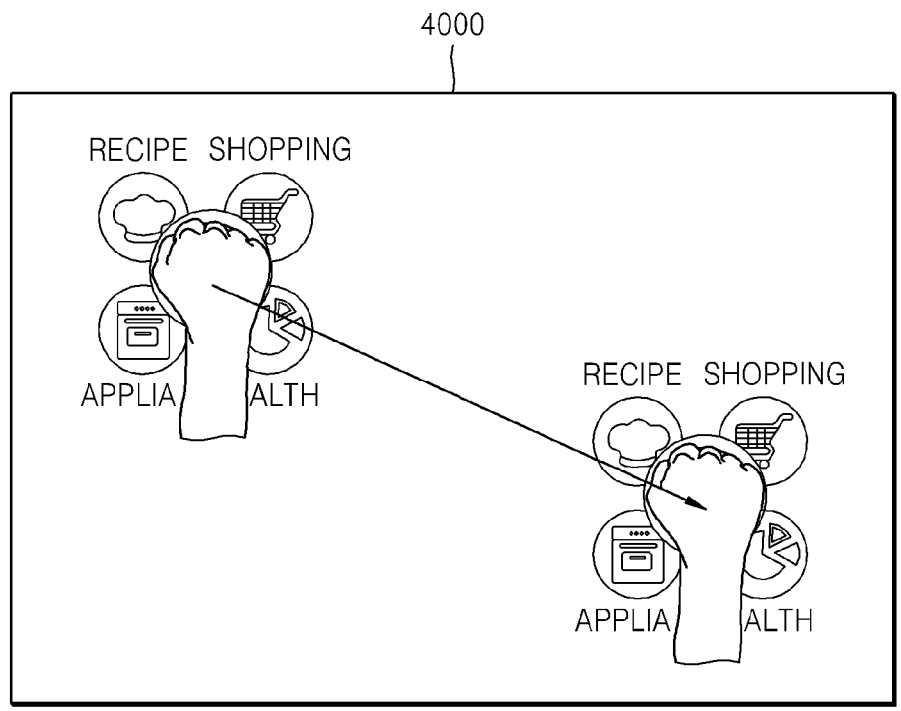
FIG. 16 illustrates an example in which a menu image that is displayed on the plate is moved based on a user gesture, according to an exemplary embodiment.

FIG. 16 illustrates an example in which a menu image that is displayed on the plate 4000 is moved based on a user gesture, according to an exemplary embodiment.

Referring to FIG. 16, a user may move a closed hand on the plate 4000, and accordingly, the menu image on the plate 4000 may be moved together with the user's hand.

Figure 17:
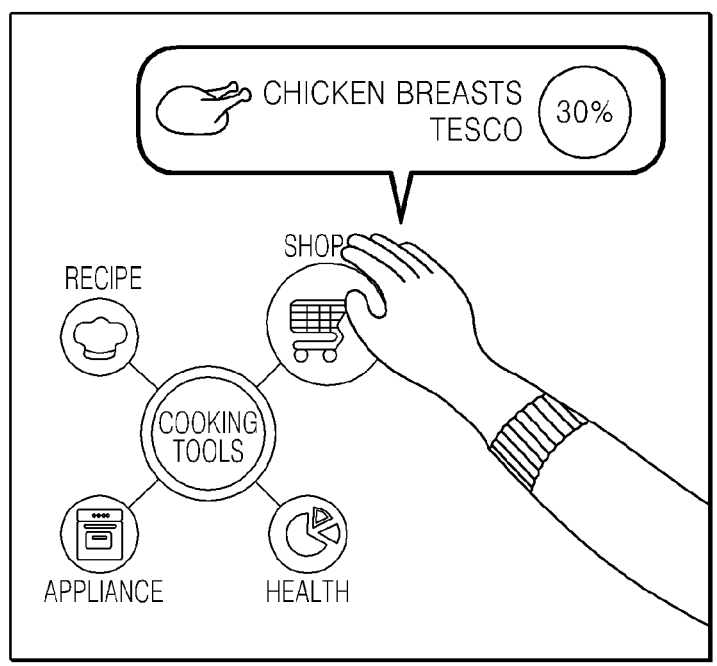
FIG. 17 illustrates an example in which shopping information is projected onto the plate, according to an exemplary embodiment.

FIG. 17 illustrates an example in which shopping information is projected onto the plate 4000, according to an exemplary embodiment.

Referring to FIG. 17, when a user selects a 'SHOPPING' icon of a menu image that is projected onto the plate 4000, the shopping information that is used by the user to purchase ingredients may be projected onto the plate 4000. The shopping information may include, but is not limited to, a name of the ingredients, a link address of a website that sells the ingredients, and a link address for downloading a coupon related to the purchase of the ingredients.

Figure 18:
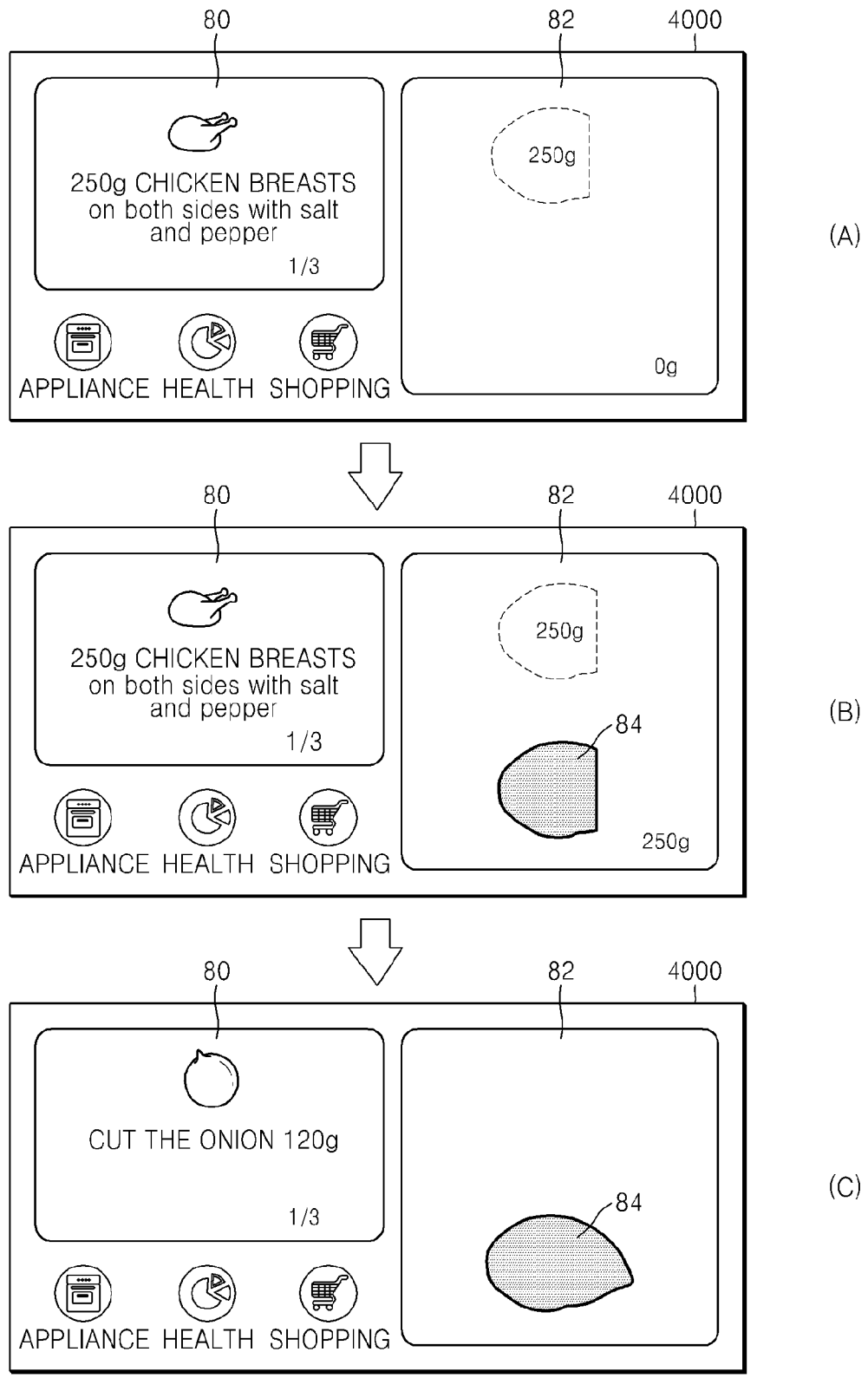
FIG. 18 illustrates an example in which cooking information is displayed on the plate so as to allow a user to prepare ingredients for food, according to an exemplary embodiment.

FIG. 18 illustrates an example in which cooking information is displayed on the plate 4000 so as to allow a user to prepare ingredients for food, according to an exemplary embodiment.

Referring to FIG. 18(*a*), cooking information about a chicken breast that is an ingredient of a selected food may be projected onto the plate 4000. For example, information about a name and weight of the chicken breast may be displayed on an upper left area 80 of the plate 4000. Also, information for guiding the user to prepare ingredients may be displayed on a right area 82 of the plate 4000. For example, an approximate size of the chicken breast is displayed using a dotted line, and a weight of 250 g of the chicken breast may be displayed. Also, a weight of the chicken breast on the plate 4000 may be displayed as 0 g.

The mobile device 1000 may provide an image of the chicken breast on the plate 4000 to the server 6000, and may receive a weight value of the chicken breast from the server 6000, so that the mobile device 1000 may project the weight of the chicken breast onto the plate 4000. In this case, the server 6000 may estimate a volume of the chicken breast based on an image of the chicken breast. Also, the server 6000 may have a density value of a chicken breast previously stored, and thus may calculate the weight of the chicken breast by multiplying the density value of the chicken breast by the volume of the chicken breast. Also, the mobile device 1000 may receive the weight value of the chicken breast from the server 6000, and may project the weight value of the chicken breast onto the plate 4000.

A predetermined sensor (e.g., a pressure sensor) may be included in the plate 4000, and the plate 4000 may measure the weight of the chicken breast on the plate 4000 by using the sensor. In this case, the mobile device 1000 may receive the weight value of the chicken breast from the plate 4000, and may project the weight value of the chicken breast onto the plate 4000.

Referring to FIG. 18(*b*), the user may prepare a chicken breast 84 by referring to the dotted line displayed on the plate 400, and may place the chicken breast 84 on the plate 4000. When the chicken breast 84 is placed on the plate 4000, the mobile device 1000 may display a weight of 250 g of the chicken breast 84 on the plate 4000.

Referring to FIG. 18(*c*), cooking information about an onion that is another ingredient of the selected food may be projected onto the plate 4000. For example, information about a name and weight of the onion may be displayed on the upper left area 80 of the plate 4000.

Figure 19:
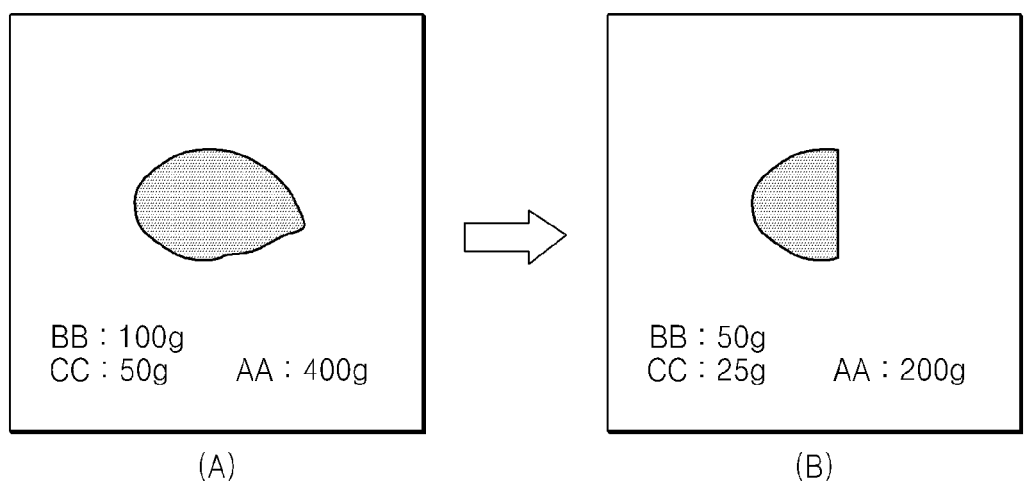
FIG. 19 illustrates an example in which information about ingredients for food is changed when a weight of the ingredients on the plate is changed, according to an exemplary embodiment.

FIG. 19 illustrates an example in which information about ingredients for food is changed when a weight of the ingredients on the plate 4000 is changed, according to an exemplary embodiment.

As illustrated in FIG. 19(*a*), when a first ingredient AA is placed on the plate 4000, the mobile device 1000 may recognize that a name of the first ingredient is AA and its weight is 400 g, by using a captured image of the first ingredient. The mobile device 1000 may project the name and weight of the first ingredient AA onto the plate 4000 by using the projector 3000. For example, information "AA:400 g" may be projected onto the plate 4000.

The mobile device 1000 may recognize that 100 g of a second ingredient BB and 50 g of a third ingredient CC is required for the user to cook the selected food, and may project ingredients information of "BB:100 g" and "CC:50 g" onto the plate 4000.

As illustrated in FIG. 19(*b*), a weight of the first ingredient AA on the plate 4000 may be changed from 400 g to 200 g. In this case, the mobile device 1000 may recognize that the weight of the first ingredient AA is changed from 400 g to 200 g by using a captured image of the first ingredient AA.

Since the weight of the first ingredient AA is changed, the mobile device 1000 may change "AA:400 g", which was projected onto the plate 4000, to "AA:300 g" by using the projector 3000. Also, since the weight of the first ingredient AA is changed, images of the first, second, and third ingredients AA, BB, and CC may be displayed together on the plate 4000. In this case, the mobile device 1000 may express a change in weight of the first, second, and third ingredients AA, BB, and CC by changing shapes and sizes of the images of the first, second, and third ingredients AA, BB, and CC that are displayed on the plate 4000. Various animation effects may be applied to the images of the first, second, and third ingredients AA, BB, and CC that are displayed on the plate 4000.

An image of completed food may be displayed on the plate 4000. Also, when the weight of the first ingredient AA is changed, the image of completed food may be changed and displayed on the plate 4000.

Figure 20:
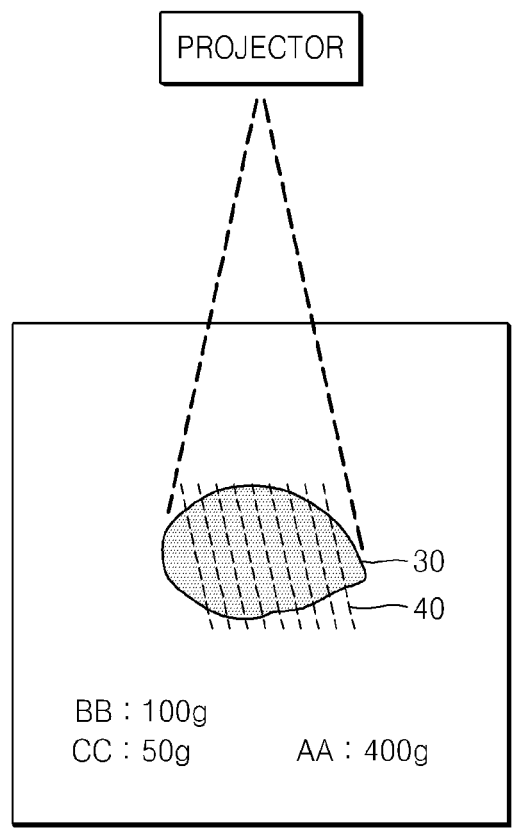
FIG. 20 illustrates an example in which a cutting guide line is projected onto ingredients on the plate, according to an exemplary embodiment.

FIG. 20 illustrates an example in which a cutting guide line 40 is projected onto ingredients 30 on the plate 4000, according to an exemplary embodiment.

Referring to FIG. 20, the mobile device 1000 may project the cutting guide line 40 onto the ingredient 30 on the plate 400 by using the projector 3000. The mobile device 1000 may project the cutting guide line 40 onto the ingredient 30 so as to allow a user to easily cut the ingredient 30 during an ingredients cutting process. Then, the user may cut the ingredient 30 along the cutting guide line 40.

The mobile device 1000 may determine a projection target position on which the cutting guide line 40 is projected, an interval of the cutting guide line 40, a total number of the cutting guide line 40, and a direction of the cutting guide line 40, based on a shape and a position of the ingredient 30 on the plate 4000.

Figure 21A:
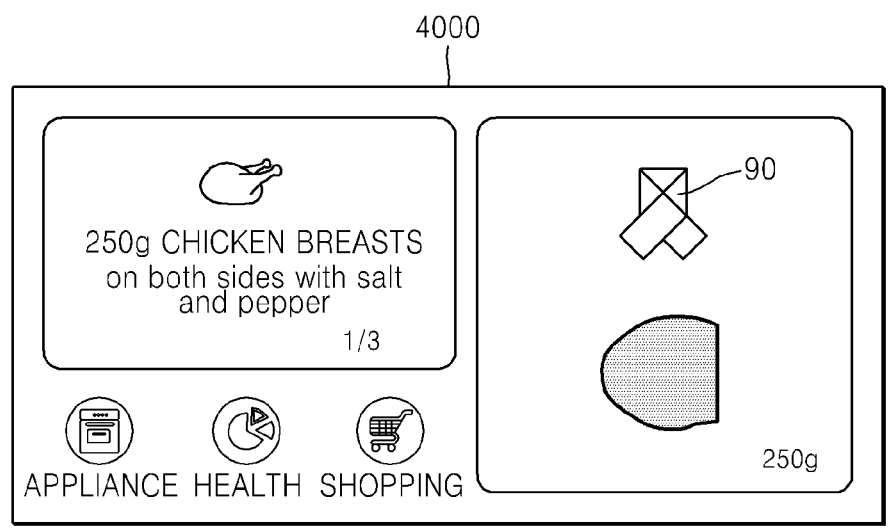
FIGS. 21A and 21B illustrate examples in which a comment about cooking of food on the plate is projected, according to an exemplary embodiment.
Figure 21B:
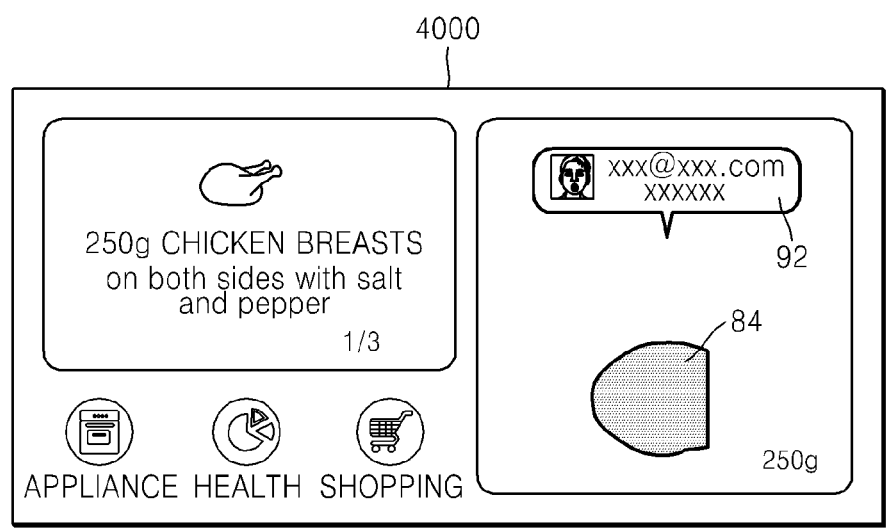

FIG. 21 illustrates an example in which a comment about cooking of food on the plate 4000 is projected, according to an exemplary embodiment.

Referring to FIG. 21(*a*), the mobile device 1000 may collect the comment of another user, which is related to the cooking of the food, and in order to inform a user of the collected comment, the mobile device 1000 may display an icon 90 on the plate 4000. Also, in order to inform the user of the collected comment, the mobile device 1000 may output an alarm sound.

When the user selects the icon 90, as illustrated in FIG. 21(*b*), the mobile device 1000 may display the collected comment in a comment balloon 92 on the plate 4000. In the comment balloon 92, an e-mail address and a photo of the user who provided the comment may be displayed. The comment may be a text, a photo, a video, or an audio.

Thus, the user may cook the food by referring to the comment of the other user which is displayed on the plate 4000.

Figure 22:
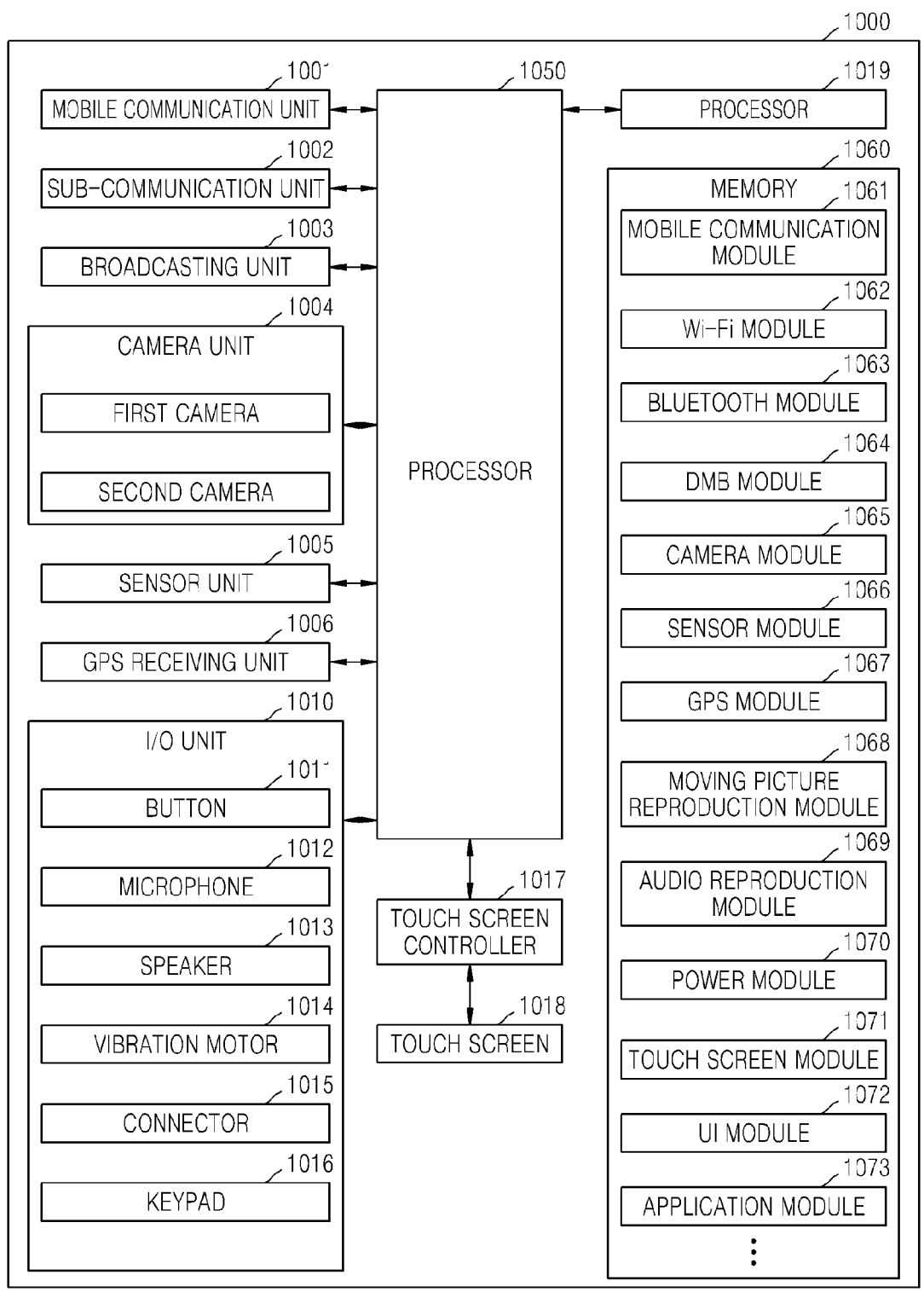
FIG. 22 is a block diagram illustrating the mobile device, according to an exemplary embodiment.

FIG. 22 is a block diagram illustrating the mobile device 1000, according to an exemplary embodiment.

A mobile communication unit 1001 performs a call set-up, data communication, or the like with a base station via a cellular network such as a third generation (3G) network or a fourth generation (4G) network. A sub-communication unit 1002 performs a function for short-distance communication, for example on a Bluetooth or NFC network. A broadcasting unit 1003 receives a Digital Multimedia Broadcasting (DMB) signal. At least one of the mobile communication unit 1001 and the sub-communication unit 1002 may exchange data with the household appliance 5000 and the server 6000.

A camera unit 1004 includes a lens and optical elements used to capture a still image and/or a moving picture.

A sensor unit 1005 may include a gravity sensor for sensing motion of the mobile device 1000, a luminance sensor for sensing intensity of light, a proximity sensor for sensing proximity of a person, a motion sensor for sensing motion of a person, or the like.

A global positioning system (GPS) receiving unit 1006 receives a GPS signal from a satellite. Using the GPS signal, various services may be provided to a user.

An input/output (I/O) unit 1010 provides an interface for the external device 2000 or a person, and includes one or more of a button 1011, a microphone 1012, a speaker 1013, a vibration motor 1014, a connector 1015, and a keypad 1016. The connector 1015 is connected to the camera 2000 and the projector 3000, and exchanges data with the camera 2000 and the projector 3000.

A touch screen 1018 receives a touch input from the user. A touch screen controller 1017 transfers, to a processor 1050, a touch input that is input via the touch screen 1018. A power supply unit 1019 is connected to a battery or an external power source so as to supply power for the mobile device 1000.

The processor 1050 projects cooking information onto the plate 4000 by executing programs stored in a memory 1060.

The programs stored in the memory 1060 may be divided into a plurality of modules according to their functions. That is, the programs stored in the memory 1060 may be divided into a mobile communication module 1061, a Wi-Fi module 1062, a Bluetooth module 1063, a DMB module 1064, a camera module 1065, a sensor module 1066, a GPS module 1067, a moving picture reproduction module 1068, an audio reproduction module 1069, a power module 1070, a touch screen module 1071, a user interface (UI) module 1072, an application module 1073, or the like.

Functions of the modules may be intuitively deduced from their respective titles, by one of ordinary skill in the art, and thus, only the application module 1073 will be described below. The application module 1073 may allow the mobile device 1000 to recognize ingredients on the plate 4000, to provide a food recommendation list to a user, and to provide various types of information related to cooking of food.

In more detail, the application module 1073 may obtain cooking information about cooking food, and may project the cooking information onto the plate 4000 by using the projector 4000. The application module 1073 may receive an image of ingredients on the plate 4000 from the camera 2000, and may provide the food recommendation list to the user based on the image of the ingredients and user information. The cooking information and the food recommendation list may be generated by the application module 1073, but one or more embodiments are not limited thereto. The application module 1073 may receive the cooking information and the food recommendation list from the server 6000.

Also, the application module 1073 may select predetermined food based on a user input, and may project cooking information about the selected food onto the plate 4000 by using the projector 3000.

The application module 1073 may collect IDs of ingredients, which are contained in the household appliance 5000, from the household appliance 5000. Also, the mobile device 1000 may check ingredients to be purchased for cooking the food, based on the collected IDs of the ingredients. The mobile device 1000 may provide shopping information related to the ingredients to be purchased to the user.

The application module 1073 may receive, from the household appliance 5000, information about an operation of the household appliance 5000 that is used in a current cooking process. The application module 1073 may inform the user with a cooking status related to the current cooking process, based on the information about the operation of the household appliance 5000.

The application module 1073 may recognize the ingredients or food on the plate 4000, and may provide nutrition information related to the recognized ingredients or food to the user.

Figure 23:
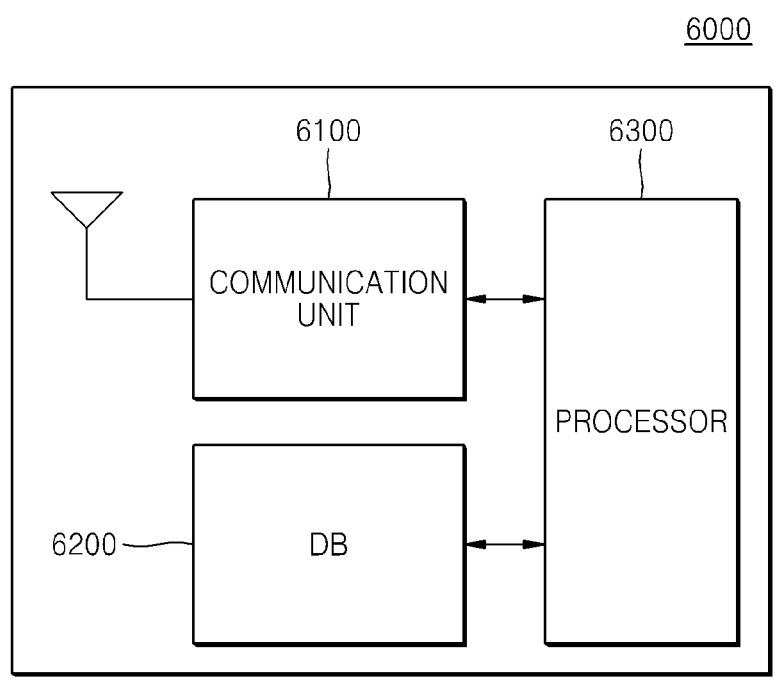
FIG. 23 is a block diagram of the server, according to an exemplary embodiment.

FIG. 23 is a block diagram of the server 6000, according to an exemplary embodiment.

As illustrated in FIG. 23, the server 6000 includes a communication unit 6100, a database DB 6200, and a processor 6300.

The communication unit 6100 exchanges data with the mobile device 1000 via the network 7000. Also, when the household appliance 5000, the camera 2000, and the projector 3000 have a communication function, the communication unit 6100 may exchange data with the household appliance 5000, the camera 2000, and the projector 3000.

The DB 6200 stores various types of information that are required by the server 6000 to recognize ingredients on the plate 4000, to generate a food recommendation list, and to generate cooking information about food cooking, shopping information, and nutrition information.

The processor 6300 provides, to the mobile device 1000, at least one of information about the ingredients on the plate 4000, the food recommendation list, and the cooking information about food cooking. The processor 6300 may receive an image of the ingredients from the mobile device 1000, may analyze the image of the ingredients, and then may recognize a name, a type, and a weight of the ingredients. Also, the processor 6300 may receive user information from the mobile device 1000, and may recommend predetermined food by using the user information. Also, the processor 6300 may provide, to the mobile device 1000, ingredients information about ingredients used in cooking and a plurality of pieces of information about detailed cooking processes. The processor 6300 may provide shopping information and nutrition information related to food to the mobile device 1000.

The one or more exemplary embodiments may be embodied as a computer-readable recording medium, e.g., a program module to be executed in one or more computers, which include computer-readable commands. The computer storage medium may include any usable medium that may be accessed by a computer, volatile and non-volatile media, and detachable and non-detachable media. Also, the computer storage medium may include a computer storage medium and a communication medium. A computer storage medium includes all of volatile and non-volatile media, and detachable and non-detachable media which are designed to store information including computer readable commands, data structures, program modules or other data. A communication medium includes computer-readable commands, a data structure, a program module, and other transmission mechanisms, and includes other information transmission mediums.

in the embodiments described herein may have many different forms and should not be construed as being limited to the specific features set forth herein; rather, these embodiments are provided so that this disclosure will be thorough and complete, and will fully convey the inventive concept to those of ordinary skill in the art. For example, configuring elements that are singular forms may be executed in a distributed fashion, and also, configuring elements that are distributed may be combined and then executed.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method, performed by a mobile device, of providing information that is used by a user to cook food, the method comprising:

receiving, from a camera, an ingredients image of at least one ingredient on a plate;
determining the at least one ingredient based on the ingredients image;
determining a food recommendation list related to the at least one ingredient, based on user information;
receiving an input from a user selecting a food from the food recommendation list;
obtaining cooking information about the selected food, wherein the cooking information comprises information about a type and a weight of at least one additional ingredient that is used to cook the food, and information about a series of detailed cooking processes of cooking the food; and
providing the cooking information to a projector that is connected to the mobile device, wherein providing the cooking information comprises first providing the information about the type and the weight of the at least one additional ingredient to the projector, and second, sequentially providing the series of detailed cooking processes to the projector.

2. The method of claim 1, wherein the determining the at least one ingredient comprises providing the ingredients image to a server, and receiving, from the server, information about a type and a weight of the at least one ingredient.

3. The method of claim 1, wherein the determining the food recommendation list comprises providing the user information to a server, and receiving, from the server, the food recommendation list, wherein the food recommendation list comprises food recommended by the server based on the ingredients image and the user information.

4. The method of claim 3, wherein the food recommendation list is recommended based on at least one of a weight of the user, a gender of the user, preferred food of the user, and a health condition of the user.

5. The method of claim 1, further comprising:
determining whether one or more additional ingredients that are used to cook the food are contained in a refrigerator connected to the mobile device; and
obtaining shopping information about at least one ingredient that is not contained in the refrigerator and that is one of the one or more additional ingredients.

6. The method of claim 5, further comprising at least one of:
displaying the shopping information on a screen of the mobile device, and
providing the shopping information to the projector.

7. A method, performed by a mobile device, of providing information that is used by a user to cook food, the method comprising:
receiving, from a camera, an ingredients image of at least one ingredient on a plate;
determining the at least one ingredient based on the ingredients image;
determining a food recommendation list related to the leas one ingredient, based on user information;
receiving an input from a user selecting a food from the food recommendation list;
obtaining cooking information about the selected food;
providing the cooking information to a projector or that is connected to the mobile device; and
when an amount of the at least one ingredient on the plate is changed, determining new cooking information based on a new weight of the at least one ingredient, and providing the new cooking information to the projector.

8. A method, performed by a mobile device, of providing information that is used by a user to cook food, the method comprising:
receiving, from a camera, an ingredients image of at least one ingredient on a plate;
determining the at least one ingredient based on the ingredients image;
determining a food recommendation list related to the at least one ingredient, based on user information;
receiving an input from a user selecting a food from the food recommendation list;
obtaining cooking information about the selected food; and
providing the cooking information to a projector that is connected to the mobile device,
wherein the receiving the ingredients image comprises receiving the ingredients image from the camera via a cradle device with which the mobile device is docked, and wherein the providing the cooking information to the projector comprises providing the cooking information to the projector via the cradle device.

9. A system for providing cooking information, the system comprising:
a mobile device, comprising:
a memory in which a cooking information program is stored; and
a display which displays the cooking information,
a communication unit which receives, from a camera, an ingredients image of at least one ingredient on a plate;
an input/output unit which receives input from a user;
a communication unit which communicates with a projector; and
a processor which executes the cooking information program and provides cooking information to a display;
wherein the processor determines the at least one ingredient based on the ingredients image; determines a food recommendation list related to the at least one ingredient, based on user information stored in the memory; receives, from the input/output unit, information regarding a food selected by the user; determines cooking information about the selected food; and instructs the communication unit to transmit the cooking information to the projector,
wherein the cooking information comprises information about a type and a weight of at least one additional ingredient that is used to cook the food, and information about a series of detailed cooking processes of cooking the food, and
wherein the projector first projects the information about the type and the weight of the at least one additional ingredient, and second, sequentially projects the series of detailed cooking processes.

10. The system of claim 9, further comprising:
the projector which projects the cooking information onto the plate on which the at least one ingredient is disposed.

11. The system of claim 10, wherein:
the processor determines whether one or more additional ingredients that are used to cook the food are contained in a refrigerator connected to the mobile device; and
the processor obtains shopping information about at least one ingredient that is not contained in the refrigerator and that is one of the one or more additional ingredients.

12. The system of claim 11, wherein the processor provides the shopping information to at least one of the display and the projector.

13. The system of claim 9, wherein the processor provides the ingredients image to a server, and receives information about a type and a weight of the ingredients from the server.

14. The system of claim 13, wherein the food recommendation list is determined based on at least one of a weight of the user, a gender of the user, preferred food of the user, and a health condition of the user.

15. The system of claim 9, wherein the processor provides the user information to a server, and receives, from the server, the food recommendation list; wherein the food recommendation list comprises food recommended by the server based on the ingredients image and the user information.

16. A system for providing cooking information, the system comprising:
a mobile device, comprising:
a memory in which a cooking information program is stored; and
a display which displays the cooking information,
a communication unit which receives, from a camera, an ingredients image of at least one ingredient on a plate;
an input/output unit which receives input from a user;
a communication unit which communicates with a projector; and
a processor which executes the cooking information program and provides cooking information to a display;
wherein the processor determines the at least one ingredient based on the ingredients image; determines a food recommendation list related to the at least one ingredient, based on user information stored in the memory; receives, from the input/output unit, information regarding a food selected by the user; determines cooking information about the selected food; and instructs the communication unit to transmit the cooking information to the projector, and
wherein, when an amount of the at least one ingredient on the plate is changed, the processor determines new cooking information based on a new weight of the at least one ingredient, and instructs the communication unit to transmit the new cooking information to the projector.

17. A system for providing cooking information, the system comprising:
a mobile device, comprising:
a memory in which a cooking information program is stored; and
a display which displays the cooking information,
a communication unit which receives, from a camera, an ingredients image of at least one ingredient on a plate;
an input/output unit which receives input from a user;
a communication unit which communicates with a projector; and
a processor which executes the cooking information program and provides cooking information to a display; and
a cradle device,
wherein the processor determines the at least one ingredient based on the ingredients image; determines a food recommendation list related to the at least one ingredient, based on user information stored in the memory; receives, from the input/output unit, information regarding a food selected by the user; determines cooking information about the selected food; and instructs the communication unit to transmit the cooking information to the projector, and
wherein the mobile device is docked in the cradle device and wherein the mobile device is connected with the camera and the projector via the cradle device.

18. A method, performed by a server, of providing information that is used by a user to cook food, the method comprising:
receiving, from a mobile device, an ingredients image of at least one ingredient on a plate;
determining the at least one ingredient based on the ingredients image;
receiving, from the mobile device, user information;
generating cooking information about a food that is related to the at least one ingredient, based on the user information;
transmitting the cooking information to the mobile device; and
determining new cooking information based on a new weight of the at least one ingredient when an amount of the at least one ingredient on the plate is changed, and transmitting the new cooking information to the mobile device.

19. A method, performed by a mobile device, of providing information that is used by a user to cook food, the method comprising:
receiving, from a camera, an ingredients image of at least one ingredient on a plate;
determining the at least one ingredient based on the ingredients image;
providing cooking information, which is about food related to the at least one ingredient, to a projector that is connected to the mobile device; and
determining new cooking information based on a new weight of the at least one ingredient when an amount of the at least one ingredient on the plate is changed, and providing the new cooking information to the projector.

20. A non-transitory computer-readable recording medium having recorded thereon a program for a mobile device providing cooking information, the program comprising instructions for:
receiving, from a camera, an ingredients image of at least one ingredient on a plate,
determining the at least one ingredient based on the ingredients image;
providing cooking information, which is about food related to the at least one ingredient, to a projector that is connected to the mobile device; and
determining new cooking information based on a new weight of the at least one ingredient when an amount of the at least one ingredient on the plate is changed, and providing the new cooking information to the projector.

21. A method of providing cooking information comprising:
a camera obtaining an ingredients image of at least one ingredient disposed on a plate;
a hardware processor of a mobile device receiving the ingredients image and determining the at least one ingredient based on the ingredients image;
the hardware processor determining cooking information of food including the at least one ingredient and transmitting the cooking information to a projector;
the projector projecting an image of the cooking information onto the plate; and
the hardware processor determining new cooking information based on a new weight of the at least one ingredient when an amount of the at least one ingredient on the plate is changed, and transmitting the new cooking information to the projector.

* * * * *